United States Patent
Sato et al.

(10) Patent No.: US 6,738,222 B2
(45) Date of Patent: May 18, 2004

(54) THIN-FILM MAGNETIC HEAD AND METHOD OF MANUFACTURING SAME

(75) Inventors: Yoshikazu Sato, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 187 days.

(21) Appl. No.: 09/985,601

(22) Filed: Nov. 5, 2001

(65) Prior Publication Data

US 2002/0093763 A1 Jul. 18, 2002

(30) Foreign Application Priority Data

Nov. 10, 2000 (JP) .................................... 2000-343245
Mar. 21, 2001 (JP) .................................... 2001-081644

(51) Int. Cl.[7] .............................................. G11B 5/147
(52) U.S. Cl. ...................................................... 360/126
(58) Field of Search ................................ 360/126, 317

(56) References Cited

U.S. PATENT DOCUMENTS 6,166,880 A * 12/2000 Kobayashi et al. ......... 360/126
6,373,657 B1    4/2002 Kamijima
6,469,876 B1 * 10/2002 Sasaki et al. ............... 360/317
6,483,664 B2 * 11/2002 Kamijima .................. 360/126
6,513,228 B1 *  2/2003 Khizroev et al. ......... 29/603.14

FOREIGN PATENT DOCUMENTS

| JP | A 11-102506  | 4/1999 |
| JP | A 2000-57522 | 2/2000 |
| JP | A 2000-67413 | 3/2000 |
| JP | A 2000-149218| 5/2000 |

OTHER PUBLICATIONS

Head/Media Las Vegas 2000 Show Directory, Nov. 11–12, 2000.

* cited by examiner

Primary Examiner—David Ometz
Assistant Examiner—Mark Blouin
(74) Attorney, Agent, or Firm—Oliff & Berridge, PLC

(57) ABSTRACT

A thin-film magnetic head comprises first and second magnetic layers, a gap layer provided between the first and second magnetic layers, and a thin-film coil at least a part of which is disposed between the first and second magnetic layers. The second magnetic layer has a pole portion layer, a yoke portion layer, and a coupling portion. The head further comprises a non-magnetic layer provided on a surface of the pole portion layer farther from the gap layer. The yoke portion layer interfaces with the rear end surface of the pole portion layer, and is greater than the pole portion layer in thickness in a cross section containing the interface.

11 Claims, 35 Drawing Sheets

THIN-FILM MAGNETIC HEAD AND METHOD OF MANUFACTURING SAME

BACKGROUND OF THE INVENTION

Field of the Invention

The present invention relates to a thin-film magnetic head having at least an induction-type electromagnetic transducer for writing, and to a method of manufacturing such a thin-film magnetic head.

The recording schemes for a magnetic read/write apparatus include a longitudinal magnetic recording scheme which employs the direction of signal magnetization along the surface of a recording medium (or in the longitudinal direction) and a vertical magnetic recording scheme which employs the direction of signal magnetization perpendicular to the surface of the recording medium. When compared with the longitudinal magnetic recording scheme, the vertical magnetic recording scheme is said to be less affected by the thermal fluctuation of a recording medium and therefore possible to implement a higher linear recording density.

In general, the thin-film magnetic head that employs the longitudinal magnetic recording scheme comprises: a medium facing surface (or air bearing surface) that faces toward a recording medium; a first magnetic layer and a second magnetic layer magnetically coupled to each other and including magnetic pole portions that are opposed to each other and placed in regions of the magnetic layers on a side of the medium facing surface, with a gap layer provided between the pole portions; and a thin-film coil at least a part of which is placed between the first and second magnetic layers and insulated from the first and second magnetic layers.

On the other hand, examples of the thin-film magnetic head that employs the vertical magnetic recording scheme include a ring head having the same structure as that of the thin-film magnetic head that employs the longitudinal magnetic recording scheme, and a single magnetic pole head for applying a magnetic field in a direction perpendicular to the surface of a recording medium with one main magnetic pole. Generally, for the single magnetic pole head, used as a recording medium is a two-layer medium that has a soft magnetic layer and a magnetic recording layer stacked on a substrate.

With an increase in the recording density in recent years, track widths of thin-film magnetic heads have been required to be reduced. Accordingly, it has also been desired that the main magnetic pole in the aforementioned single magnetic pole head be reduced in width. However, as described below, there have been two problems which make it difficult to reduce the width of the main magnetic pole.

A first problem is that it is difficult to pattern the main magnetic pole with high accuracy, for example, in such a manner that the main magnetic pole is made to have a width of 0.5 $\mu$m or less. The main magnetic pole is formed by electroplating (frame plating), for example, using a resist frame that is formed by photolithography. Conventionally, the main magnetic pole is formed on a hill-like raised portion of an insulating layer that covers the coil, and therefore, the resist frame is formed on the insulating layer having great differences in height of irregularities. In this case, it is difficult to form the resist to have a uniform thickness, and accordingly it is difficult to pattern the resist frame with accuracy. This in turn makes it difficult to pattern the main magnetic pole with high accuracy.

A second problem is that a reduction in width of the main magnetic pole causes a magnetic flux to be saturated before the flux reaches the tip of the main magnetic pole, thereby causing a reduction in the magnetic field generated from the tip of the main magnetic pole in the medium facing surface.

Conventional thin-film magnetic heads for use with the longitudinal magnetic recording scheme have encountered similar problems. To overcome these problems, thin-film magnetic heads for use with the longitudinal magnetic recording scheme often employ a structure in which one of magnetic layers is divided into a magnetic pole portion to be exposed in the medium facing surface and a yoke portion for introducing magnetic flux into the magnetic pole portion.

Accordingly, it has been proposed for the single magnetic pole heads for use with the vertical magnetic recording scheme, too, to employ such a structure in which the main magnetic pole is divided into a magnetic pole portion to be exposed in the medium facing surface and a yoke portion for introducing magnetic flux into the magnetic pole portion. This structure makes it possible to efficiently introduce magnetic flux to the tip of the main magnetic pole and to form a magnetic pole portion that is small in width, by making the saturated magnetic flux density of the magnetic pole portion greater than that of the yoke portion.

Incidentally, for conventional thin-film magnetic heads for use with the longitudinal magnetic recording scheme, where they are configured such that one magnetic layer is divided into a magnetic pole portion and a yoke portion, the yoke portion has often been joined to only one of surfaces of the magnetic pole portion that is farther from the gap portion. However, this structure provides only a small area of the interface between the magnetic pole portion and the yoke portion, which causes a magnetic flux to be readily saturated at the interface. Therefore, this structure cannot meet the recent demand for increasing magnetic fields for writing operations. To overcome this, thin-film magnetic heads having the following structure have been proposed in Published Unexamined Japanese Patent Application (KOKAI) No. Hei 11-102506, No. 2000-57522, No. 2000-67413 and No. 2000-149218. That is, the heads have a structure in which the yoke portion is joined to the magnetic pole portion not only at the surface of the magnetic pole portion farther from the gap portion but also at both side surfaces of the magnetic pole portion and at a surface of the magnetic pole portion farther from the medium facing surface.

For the single magnetic pole heads for use with the vertical magnetic recording scheme, where they are configured such that the main magnetic pole is divided into the magnetic pole portion and the yoke portion, it is conceivable to employ the structure in which the yoke portion is joined to the magnetic pole portion not only at the surface of the magnetic pole portion farther from the gap portion but also at the side surfaces of the magnetic pole portion and the surface of the magnetic pole portion farther from the medium facing surface, like the aforementioned heads for use with the longitudinal magnetic recording scheme.

For a head for use with the vertical magnetic recording scheme, it is important to increase the intensity of magnetic field in the direction perpendicular to the surface of the recording medium. However, even if the aforementioned structure is employed for the head for use with the vertical magnetic recording scheme, it is impossible to increase the intensity of the magnetic field in the direction perpendicular to the recording medium, because the areas of the interfaces between the yoke portion and the magnetic pole portion obtained at the surface of the magnetic pole portion farther from the medium facing surface or at the side surfaces of the magnetic pole portion are relatively small as compared with the area of the interface at the surface of the magnetic pole portion farther from the gap portion.

For the head for use with the vertical magnetic recording scheme, the main magnetic pole is preferably disposed on the leading side in the traveling direction of the recording medium (or on the air-outflow-end side of the slider including the thin-film magnetic head) in order to improve the linear recording density. In this case, to further improve the linear recording density, it is preferable that one of ends of the magnetic pole portion of the main magnetic pole that is farther from the gap portion be flat in the medium facing surface. However, in the head in which the yoke portion layer is disposed to touch the surface of the magnetic pole portion farther from the gap portion, the surface of the pole portion layer farther from the gap portion will be damaged when forming the yoke portion layer, and therefore the end of the pole portion layer farther from the gap portion cannot be flat in the medium facing surface.

OBJECT AND SUMMARY OF THE INVENTION

It is therefore an object of the present invention to provide a thin-film magnetic head and a method of manufacturing same, which make it possible to increase the intensity of magnetic field generated from the magnetic pole portion in the direction perpendicular to the surface of the recording medium, and to improve recording density.

The thin-film magnetic head of the invention comprises:
a medium facing surface that faces toward a recording medium;
a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium;
a gap layer made of a non-magnetic material and provided between the first and second magnetic layers; and
a thin-film coil at least a part of which is disposed between the first and second magnetic layers and insulated from the first and second magnetic layers, wherein:
the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other,
the yoke portion layer is magnetically connected to the pole portion layer at least in part of: an end surface of the pole portion layer farther from the medium facing surface; and both side surfaces of the pole portion layer in the width direction, and
in a cross section containing an interface between the yoke portion layer and the pole portion layer, the yoke portion layer is greater than the pole portion layer in thickness.

In the thin-film magnetic head of the invention, since the yoke portion layer is greater in thickness than the pole portion layer in the cross section containing the interface between the yoke portion layer and the pole portion layer, it is possible to prevent saturation of magnetic flux in the yoke portion layer near the interface between the pole portion layer and the yoke portion layer. This makes it possible to efficiently introduce magnetic flux from the yoke portion layer into the pole portion layer via the interface, and as a result, it is possible to increase the intensity of magnetic field, generated from the magnetic pole portion, in the direction perpendicular to the surface of the recording medium. Furthermore, the thin-film magnetic head of the invention has a non-magnetic layer that is in contact with the entirety of the surface of the pole portion layer farther from the gap layer. Accordingly, it is possible to prevent the surface of the pole portion layer farther from the gap layer from being damaged in the manufacturing process of the thin-film magnetic head, and to thereby keep the surface flat.

In the thin-film magnetic head of the invention, in the cross section containing the interface between the yoke portion layer and the pole portion layer, the yoke portion layer may include: a first non-contact portion that is not in contact with the pole portion layer and is located on the side of the gap layer relative to the pole portion layer; and a second non-contact portion that is not in contact with the pole portion layer and is located on the side of the non-magnetic layer relative to the pole portion layer, the second non-contact portion being greater than the first non-contact portion in thickness.

In the thin-film magnetic head of the invention, in the cross section containing the interface between the yoke portion layer and the pole portion layer, the yoke portion layer may include a non-contact portion that is not contact with the pole portion layer and is located only on the side of the non-magnetic layer relative to the pole portion layer.

In the thin-film magnetic head of the invention, the yoke portion layer may be magnetically connected to the pole portion layer further at a surface of the pole portion layer closer to the gap layer.

In the thin-film magnetic head of the invention, the vicinity of a part of a surface of the yoke portion layer farther from the gap layer, the part being magnetically connected to the pole portion layer at least in part of: the end surface of the pole portion layer farther from the medium facing surface; and both side surfaces of the pole portion layer in the width direction, may be flattened together with a surface of the non-magnetic layer farther from the gap layer.

In the thin-film magnetic head of the invention, the yoke portion layer may be adjacent to the surface of the pole portion layer farther from gap layer via the non-magnetic layer, and may be magnetically connected to the pole portion layer via the non-magnetic layer.

In the thin-film magnetic head of the invention, the pole portion layer may have a saturated magnetic flux density equal to or greater than that of the yoke portion layer.

The thin-film magnetic head of the invention may further comprise a magnetoresistive element as a read element.

The thin-film magnetic head of the invention may be employed for a vertical magnetic recording scheme.

A method of the invention is provided for manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other.

The method comprises the steps of:
forming the first magnetic layer;
forming the gap layer;
forming the thin-film coil; and
forming the second magnetic layer having the pole portion layer and the yoke portion layer, such that the yoke portion layer is magnetically connected to the pole portion layer at least in a part of: an end surface of the pole portion layer farther from the medium facing surface; and both side surfaces of the pole portion layer in the width direction, and such that the yoke portion layer is greater in thickness than the pole portion layer in a cross section containing an interface between the yoke portion layer and the pole portion layer, and forming a non-magnetic layer that is in contact with the entirety of a surface of the pole portion layer farther from the gap layer.

According to the method of manufacturing a thin-film magnetic head of the invention, since the yoke portion layer is greater in thickness than the pole portion layer in the cross section containing the interface between the yoke portion layer and the pole portion layer, it is possible to prevent saturation of magnetic flux in the yoke portion layer near the interface between the pole portion layer and the yoke portion layer. This makes it possible to efficiently introduce magnetic flux from the yoke portion layer into the pole portion layer via the interface, and as a result, it is possible to increase the intensity of magnetic field, generated from the magnetic pole portion, in the direction perpendicular to the surface of the recording medium. Furthermore, in the method of the invention, the non-magnetic layer is formed which is in contact with the entirety of the surface of the pole portion layer farther from the gap layer. It is therefore possible to prevent the surface of the pole portion layer farther from the gap layer from being damaged in the manufacturing process of the thin-film magnetic head, and to thereby keep the surface flat.

In the method of manufacturing a thin-film magnetic head of the invention, the step of forming the second magnetic layer and the non-magnetic layer may include the steps of: forming the pole portion layer; forming the non-magnetic layer on the pole portion layer; forming at least a part of the yoke portion layer magnetically connected to the pole portion layer; forming a protective layer so as to cover the non-magnetic layer and the yoke portion layer; and polishing the protective layer to expose the non-magnetic layer, and then flattening the vicinity of a part of a surface of the yoke portion layer farther from the gap layer, the part being magnetically connected to the pole portion layer at least in part of: the end surface of the pole portion layer farther from the medium facing surface; and both side surfaces of the pole portion layer in the width direction, together with a surface of the non-magnetic layer farther from the gap layer.

Other and further objects, features and advantages of the invention will appear more fully from the following description.

DETAILED DESCRIPTION OF THE PREFERRED EMBODIMENTS

Embodiments of the invention will now be described in detail with reference to the accompanying drawings.

[First Embodiment]

Figure 1:
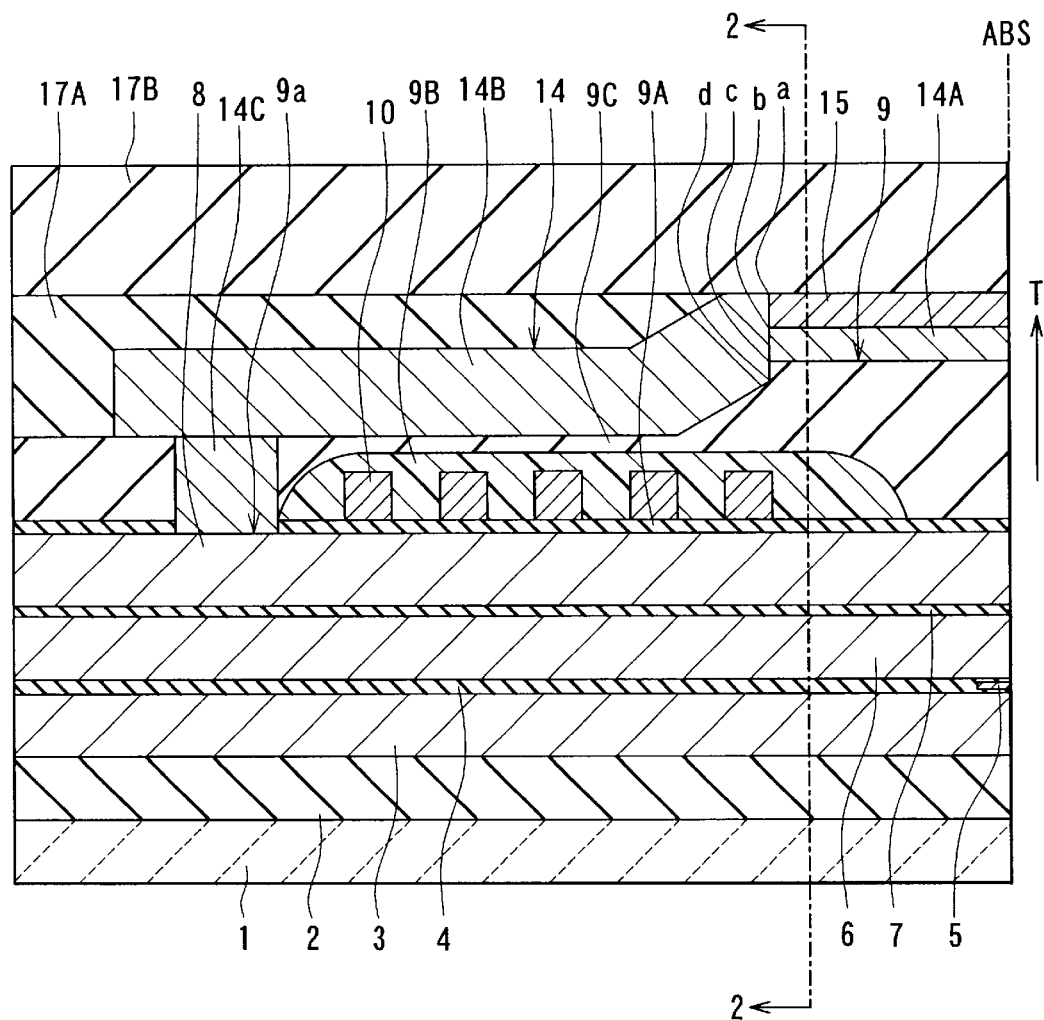
FIG. 1 is a cross-sectional view illustrating a structure of a thin-film magnetic head according to a first embodiment of the invention.
Figure 2:
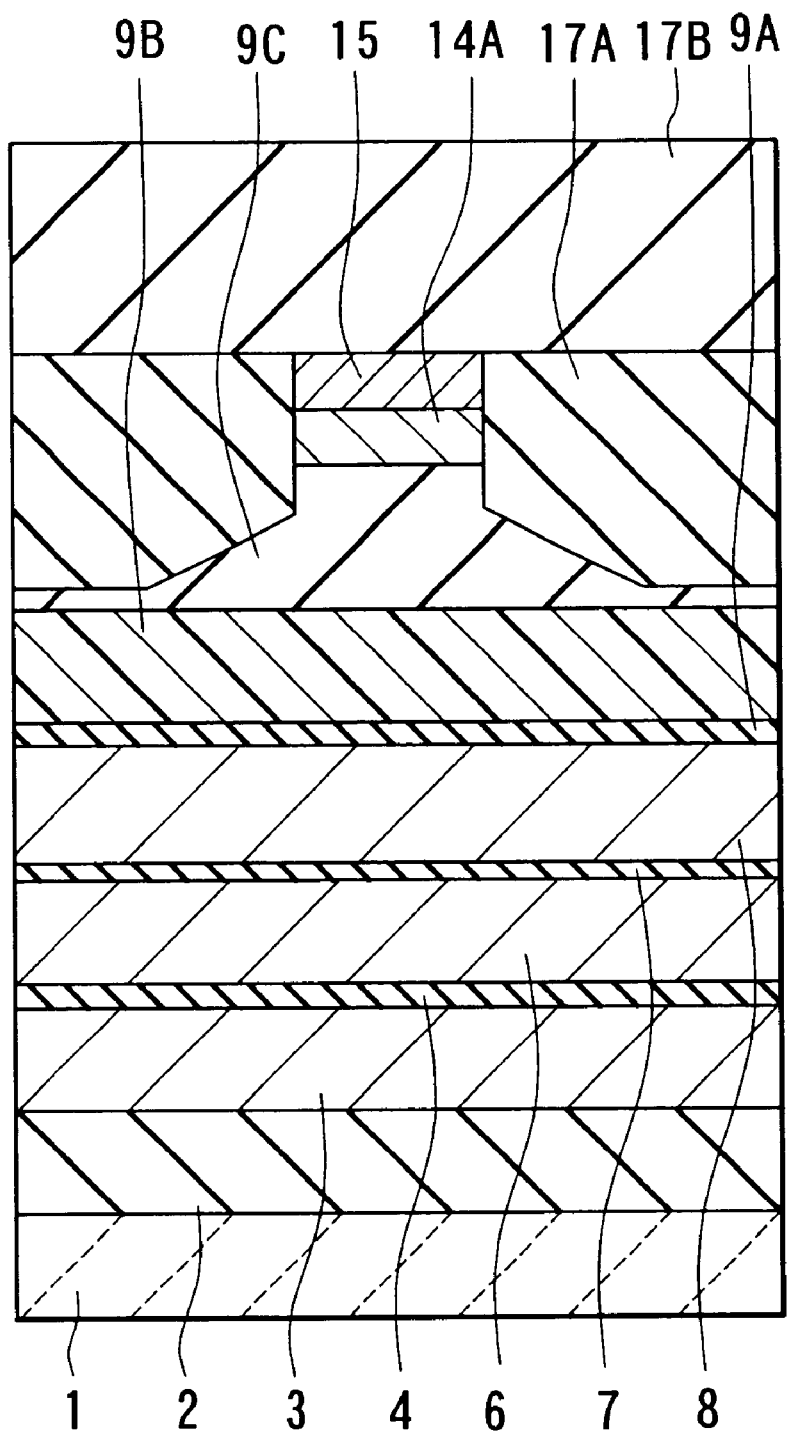
FIG. 2 is a cross-sectional view taken along line 2—2 of FIG. 1.
Figure 3:
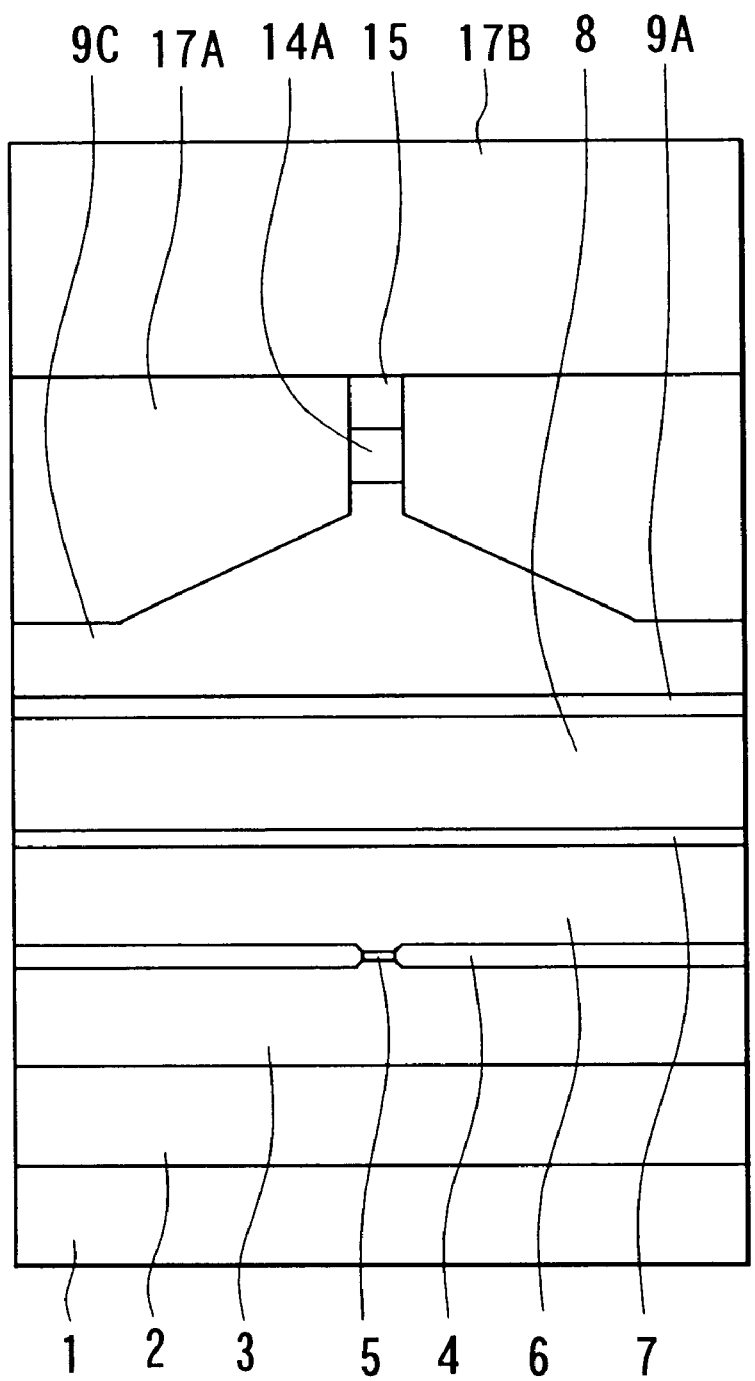
FIG. 3 is a front view illustrating the medium facing surface of the thin-film magnetic head according to the first embodiment of the invention.
Figure 4:
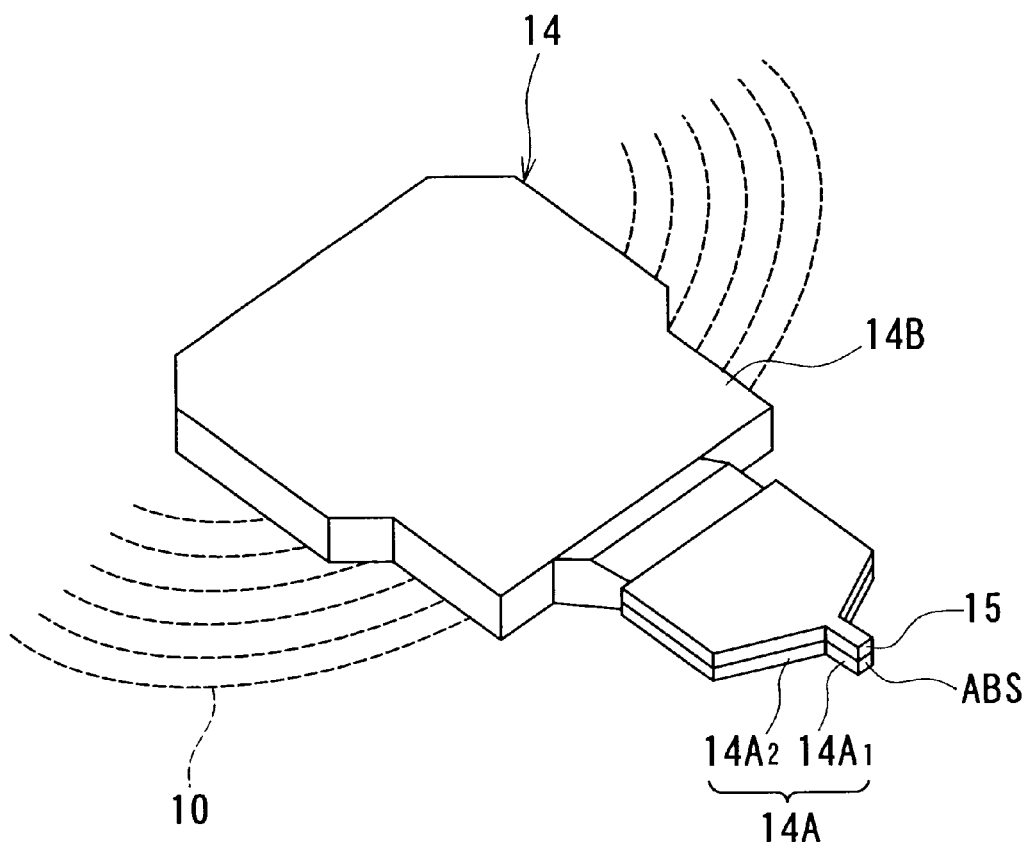
FIG. 4 is a perspective view illustrating the main part of the thin-film magnetic head according to the first embodiment of the invention.

FIG. 1 is a cross-sectional view illustrating the structure of a thin-film magnetic head according to a first embodiment of the invention. FIG. 1 shows a cross section orthogonal to the medium facing surface and the surface of the substrate. In addition, the arrow indicated by symbol T in FIG. 1 shows the traveling direction of a recording medium. FIG. 2 is a cross-sectional view taken along line 2—2 of FIG. 1. FIG. 3 is a front view illustrating the medium facing surface of the thin-film magnetic head shown in FIG. 1. FIG. 4 is a perspective view illustrating the main part of the thin-film magnetic head shown in FIG. 1.

As shown in FIG. 1 and FIG. 2, the thin-film magnetic head according to this embodiment comprises: a substrate 1 made of a ceramic material such as aluminum oxide and titanium carbide ($Al_2O_3 \cdot TiC$); an insulating layer 2 made of an insulating material such as alumina ($Al_2O_3$) and formed on the substrate 1; a bottom shield layer 3 made of a magnetic material and formed on the insulating layer 2; an MR (magnetoresistive) element 5 functioning as a read element and formed on the bottom shield layer 3 via an insulating layer 4; and a top shield layer 6 made of a magnetic material and formed on the MR element 5 via the insulating layer 4. Each of the bottom shield layer 3 and the top shield layer 6 has a thickness of, for example, 1 to 2 $\mu$m.

One of ends of the MR element 5 is located in the medium facing surface (air bearing surface) ABS. The MR element 5 may be an element made of a magnetosensitive film that exhibits a magnetoresistive effect, such as an anisotropic magnetoresistive (AMR) element, a giant magnetoresistive (GMR) element, or a tunneling magnetoresistive (TMR) element.

The thin-film magnetic head further comprises: a non-magnetic layer 7 formed on the top shield layer 6; a first magnetic layer 8 made of a magnetic material and formed on the non-magnetic layer 7; an insulating layer 9A formed on a portion of the first magnetic layer 8 in which a thin-film coil 10 is to be formed; the thin-film coil 10 formed on the insulating layer 9A; and an insulating layer 9B filled at least between windings of the thin-film coil 10. There is formed a contact hole 9a in the insulating layer 9A at a distance from the medium facing surface ABS.

For example, the first magnetic layer 8 has a thickness of 1 to 2 $\mu$m. The magnetic material for making the first magnetic layer 8 may be an iron-nickel-based alloy or Permalloy, or a high saturated magnetic flux density material to be described later. The first magnetic layer 8 may be made up of two layers or more.

The insulating layer 9A is made of a non-conductive and non-magnetic material such as alumina, and has a thickness of 0.1 to 1 $\mu$m, for example.

The thin-film coil 10 is made of a conductive material such as copper, and the winding thereof is 0.3 to 2 $\mu$m in thickness, for example. Thin-film coil 10 can have any number of turns of the winding as well as any pitch of the winding.

The insulating layer 9B is made of a non-conductive and non-magnetic material that exhibits fluidity during its formation. More specifically, the insulating layer 9B may be formed of an organic, non-conductive and non-magnetic material such as photoresist (a photosensitive resin), or a spin-on-glass (SOG) film of coating glass.

The thin-film magnetic head further comprises: a coupling portion 14C made of a magnetic material and formed on a portion of the first magnetic layer 8 in which the contact hole 9a is formed; and an insulating layer 9C formed so as to cover the thin-film coil 10 and the insulating layers 9A and 9B. The coupling portion 14C makes a part of a second magnetic layer 14 to be described later. The thin-film coil 10 is wound around the coupling portion 14C.

For example, the coupling portion 14C has a thickness of 2 to 4 $\mu$m, a depth (or the length perpendicular to the medium facing surface ABS) of 2 to 10 $\mu$m, and a width of 5 to 20 $\mu$m. For example, the magnetic material making the coupling portion 14C may be an iron-nickel-based alloy or Permalloy, or a high saturated magnetic flux density material as described later.

The insulating layer 9C is made of a non-conductive and non-magnetic material which has a better resistance to corrosion, rigidity, and insulating strength than those of the insulating layer 9B. As such a material, an inorganic, non-conductive and non-magnetic material such as alumina and silicon dioxide ($SiO_2$) may be used. The total thickness of the insulating layers 9A and 9C in the medium facing surface ABS is, for example, 2 to 4 $\mu$m. This thickness should be equal to or greater than the thickness of the coupling portion 14C.

The insulating layers 9A, 9B and 9C make up a gap layer 9 that is provided between the first magnetic layer 8 and the second magnetic layer 14 to be described later.

The thin-film magnetic head has the second magnetic layer 14 made of a magnetic material and formed on the insulating layer 9C. The second magnetic layer 14 has: the aforementioned coupling portion 14C; a pole portion layer 14A that includes a magnetic pole portion; and a yoke portion layer 14B that serves as a yoke and magnetically connects the pole portion layer 14A to the first magnetic layer 8 via the coupling portion 14C. The pole portion layer 14A is formed on the insulating layer 9C over a region extending from the medium facing surface ABS to a predetermined position located between the medium facing surface ABS and the coupling portion 14C. The yoke portion layer 14B magnetically connects an end of the coupling portion 14C, the end being located farther from the first magnetic layer 8 (hereinafter referred to as the upper end) and an end surface of the pole portion layer 14A, the end surface being located farther from the medium facing surface ABS (hereinafter referred to as the rear end surface), to each other. The yoke portion layer 14B has such a shape as forms a magnetic path, inside the yoke portion layer 14B, to connect the upper end of the coupling portion 14C and the rear end surface of the pole portion layer 14A in the shortest distance. The thin-film magnetic head further comprises a non-magnetic layer 15 that is formed on the pole portion layer 14A. The non-magnetic layer 15 is in contact with the entirety of the surface of the pole portion layer 14A farther from the gap layer 9. The thin-film magnetic head further comprises a protective layer 17A disposed around the yoke portion layer 14B and a protective layer 17B formed to cover the second magnetic layer 14. The protective layers 17A and 17B are each made of a non-conductive and non-magnetic material such as alumina.

A surface of the thin-film coil 10, the surface closer to the second magnetic layer 14, is located closer to the first magnetic layer 8 than an end of the gap layer 9 is, the end being located in the medium facing surface ABS next to the second magnetic layer 14 (or the end of the insulating layer 9C closer to the second magnetic layer 14), and than the upper end of the coupling portion 14C is.

The pole portion layer 14A is preferably 0.1 to 0.8 μm in thickness and more preferably 0.3 to 0.8 μm. In addition, the length from the medium facing surface ABS to the rear end surface of the pole portion layer 14A is 2 μm or greater.

As shown in FIG. 4, the pole portion layer 14A includes a first portion $14A_1$ located next to the medium facing surface ABS and a second portion $14A_2$ located farther from the medium facing surface ABS than the first portion $14A_1$. The first portion $14A_1$ is the magnetic pole portion of the second magnetic layer 14. The magnetic pole portion of the first magnetic layer 8 includes a portion of the first magnetic layer 8 that is opposed to the first portion $14A_1$ via the gap layer 9.

The first portion $14A_1$ has a width equal to the track width. That is, the width of the first portion $14A_1$ in the medium facing surface ABS defines the track width. The second portion $14A_2$ has a width equal to that of the first portion $14A_1$ at the interface with the first portion $14A_1$. The width of the second portion $14A_2$ gradually increases from this interface with an increase in distance from the medium facing surface ABS, and finally becomes constant.

The width of the first portion $14A_1$ in the medium facing surface ABS, that is, the track width, is preferably 0.5 μm or less, and more preferably 0.3 μm or less. The portion of the second portion $14A_2$ connected to the yoke portion layer 14B has a width greater than that of the first portion $14A_1$ in the medium facing surface ABS, and the width is 2 μm or more, for example.

For example, the yoke portion layer 14B has a thickness of 1 to 2 μm. The yoke portion layer 14B is magnetically connected to the rear end surface of the pole portion layer 14A as shown in FIG. 1 and FIG. 4.

The pole portion layer 14A has a saturated magnetic flux density equal to or greater than that of the yoke portion layer 14B. As the magnetic material to form the pole portion layer 14A, it is preferable to use a high saturated magnetic flux density material having a saturated magnetic flux density of 1.4 T or more. For example, as the high saturated magnetic flux density material, available are a material containing iron and nitrogen atoms, a material containing iron, zirconia and oxygen atoms, and a material containing iron and nickel elements. More specifically, for example, as the high saturated magnetic flux density material, it is possible to use at least one of NiFe (Ni: 45 wt %, Fe: 55 wt %), FeN and its compounds, Co-based amorphous alloys, Fe—Co, Fe—M (including oxygen atoms as required), and Fe—Co—M (including oxygen atoms as required). In the foregoing, M is at least one element selected from the group consisting of Ni, N, C, B, Si, Al, Ti, Zr, Hf, Mo, Ta, Nb, and Cu (all of which stand for chemical elements).

As the magnetic material to form the yoke portion layer 14B, it is possible to use a material containing iron and nickel elements and having a saturated magnetic flux density of the order of 1.0 T, for example. Such a material has a good resistance to corrosion and a higher resistance than that of the material to form the pole portion layer 14A. Use of such a material will facilitate formation of the yoke portion layer 14B.

To form the yoke portion layer 14B, it is also possible to use a magnetic material that is the same in compositional family as the magnetic material used to form the pole portion layer 14A. In this case, to make the saturated magnetic flux density of the yoke portion layer 14B lower than that of the pole portion layer 14A, it is preferable to use, as the magnetic material for forming the yoke portion layer 14B, a material having a lower compositional ratio of iron atoms than that of the magnetic material used to form the pole portion layer 14A.

The non-magnetic layer 15 is identical to the pole portion layer 14A in planar shape. In addition, the non-magnetic layer 15 is exposed in the medium facing surface ABS.

The non-magnetic layer 15 may be formed of, for example, a material containing titanium or tantalum (including their alloys and oxides) or an inorganic, non-conductive and non-magnetic material such as alumina or silicon dioxide ($SiO_2$). If dry etching is used to form the pole portion layer 14A, it is preferable that the non-magnetic layer 15 is formed of a material having a lower etching rate for the dry etching than those of the materials that form the pole portion layer 14A and the insulating layer 9C, of the gap layer 9, which is disposed in contact with the pole portion layer 14A. For example, available for this purpose are materials containing titanium or tantalum (including their alloys and oxides).

The surface of the pole portion layer 14A exposed in the medium facing surface ABS may have a shape of a rectangle, or a shape of a trapezoid or a triangle in which the lower side located on the trailing side in the traveling direction T of the recording medium (or on the air-inflow-end side of the slider) is shorter than the upper side. In addition, the side surfaces of the pole portion layer 14A may be concave. When the surface of the pole portion layer 14A exposed in the medium facing surface ABS has a shape of a trapezoid or a triangle, it is preferable that the side of the surface of the pole portion layer 14A exposed in the medium facing surface ABS forms an angle of 92 to 100 degrees relative to the surface of the pole portion layer 14A closer to the gap layer 9.

The vicinity of a part of the surface of the yoke portion layer 14B farther from the gap layer 9, the part being magnetically connected to the pole portion layer 14A at the rear end surface of the pole portion layer 14A, is flattened together with the surface of the non-magnetic layer 15 farther from the gap layer 9, and with the top surface of the protective layer 17A. The protective layer 17B is provided on the flattened surfaces.

As described above, the thin-film magnetic head according to this embodiment comprises the medium facing surface ABS that faces toward the recording medium, a read head, and a write head (induction-type electromagnetic transducer). The read head comprises the MR element 5 functioning as a read element, and the bottom shield layer 3 and the top shield layer 6 for shielding the MR element 5. The bottom and top shield layers 3 and 6 have portions that are located on a side of the medium facing surface ABS and opposed to each other with the MR element 5 interposed therebetween.

The write head comprises: the first magnetic layer 8 and the second magnetic layer 14 that are magnetically coupled to each other at a distance from the medium facing surface, and include magnetic pole portions disposed so as to oppose to each other with a predetermined spacing interposed therebetween along the traveling direction of the recording medium; the gap layer 9 made of a non-magnetic material and provided between the first and second magnetic layers 8 and 14; and the thin-film coil 10 at least a part of which is disposed between the first and second magnetic layers 8 and 14 and insulated from the first and second magnetic layers 8 and 14.

The second magnetic layer 14 has: the pole portion layer 14A including the magnetic pole portion, the width of the pole portion layer 14A measured in the medium facing surface ABS defining a track width; and the yoke portion layer 14B that makes a yoke portion and magnetically connects the pole portion layer 14A to the first magnetic layer 8 via the coupling portion 14C. The yoke portion layer 14B is magnetically connected to the rear end surface of the pole portion layer 14A. The pole portion layer 14A has a saturated magnetic flux density equal to or greater than that of the yoke portion layer 14B.

In this embodiment, since the second magnetic layer 14 has the pole portion layer 14A and the yoke portion layer 14B, reduction in track width is achieved without lowering the intensity of a magnetic field applied to the recording medium.

Here, a straight line is assumed which is made by intersection of the cross section shown in FIG. 1 and a cross section containing the interface between the yoke portion layer 14B and the pole portion layer 14A. On this straight line, the position of an end of the yoke portion layer 14B that is farther from the gap layer 9 is assumed to be Point a; the position of an end of the pole portion layer 14A that is farther from the gap layer 9 is assumed to be Point b; the position of the other end of the pole portion layer 14A that is closer to the gap layer 9 is assumed to be Point c; and the position of the other end of the yoke portion layer 14B that is closer to the gap layer 9 is assumed to be Point d.

In this embodiment, in the cross section containing the interface between the yoke portion layer 14B and the pole portion layer 14A, the yoke portion layer 14B is greater in thickness than the pole portion layer 14A. That is, in the cross section shown in FIG. 1, the line segment ad is longer than the line segment bc. In this arrangement, saturation of magnetic flux in the yoke portion layer 14B can be prevented in the vicinity of the interface between the pole portion layer 14A and the yoke portion layer 14B. This makes it possible to efficiently introduce magnetic flux from the yoke portion layer 14B into the pole portion layer 14A, and as a result, it is possible to increase the intensity of a magnetic field in the direction perpendicular to the surface of the recording medium, generated from the end of the pole portion layer 14A closer to the medium facing surface.

In this embodiment, in the cross section containing the interface between the yoke portion layer 14B and the pole portion layer 14A, the yoke portion layer 14B has: a first non-contact portion (corresponding to the line segment cd in FIG. 1) that is not in contact with the pole portion layer 14A and is located on the side of the gap layer 9 relative to the pole portion layer 14A; and a second non-contact portion (corresponding to the line segment ab in FIG. 1) that is not in contact with the pole portion layer 14A and is located on the side of the non-magnetic layer 15 relative to the pole portion layer 14A. The second non-contact portion preferably has a greater thickness than that of the first non-contact portion. That is, the line segment ab is preferably longer than the line segment cd. In this case, it is possible to reduce the magnetic flux coming from the yoke portion layer 14B to the first magnetic layer 8 not via the pole portion layer 14A but via the gap layer 9. This makes it possible to introduce the magnetic flux from the yoke portion layer 14B into the pole portion layer 14A with improved efficiency.

Here, the thickness of the yoke portion layer 14B in the cross section containing the interface between the yoke portion layer 14B and the pole portion layer 14A is assumed to be $T_Y$; the thickness of the pole portion layer 14A in that cross section is assumed to be $T_P$; the saturated magnetic flux density of the yoke portion layer 14B is assumed to be $B_{SY}$; and the saturated magnetic flux density of the pole portion layer 14A is assumed to be $B_{SP}$. In order to prevent saturation of magnetic flux in the yoke portion layer 14B, it is preferable that the following relationship be satisfied.

$$T_Y/T_P > B_{SP}/B_{SY}$$

In FIG. 1, the rear end surface of the pole portion layer 14A is perpendicular to the surface of the pole portion layer 14A closer to the gap layer 9. However, the rear end surface of the pole portion layer 14A may also be inclined with respect to the direction perpendicular to the surface of the pole portion layer 14A closer to the gap layer 9. In this case, the portion of the rear end surface of the pole portion layer 14A magnetically connected to the yoke portion layer is increased in area. This makes it possible to efficiently introduce the magnetic flux from the yoke portion layer 14B into the pole portion layer 14A via the rear end surface of the pole portion layer 14A, and as a result, it is possible to further increase the intensity of a magnetic field in the direction perpendicular to the surface of the recording medium, generated from the end of the pole portion layer 14A closer to the medium facing surface.

The surface of the pole portion layer 14A exposed in the medium facing surface ABS preferably has a shape of a trapezoid or a triangle in which the lower side located on the trailing side in the traveling direction T of the recording medium (or on the air-inflow-end side of the slider) is shorter than the upper side. In addition, the side surfaces of the pole portion layer 14A may be concave. If the thin-film magnetic head of this embodiment having the pole portion layer 14A of such a shape is employed for the vertical magnetic recording scheme, it is possible to prevent a variation in write track width when a skew angle is developed.

The thin-film magnetic head of this embodiment is suitable for the vertical magnetic recording scheme. When this thin-film magnetic head is used for the vertical magnetic recording scheme, the first portion $14A_1$ of the pole portion layer 14A of the second magnetic layer 14 serves as a main magnetic pole, while the magnetic pole portion of the first magnetic layer 8 serves as an auxiliary magnetic pole. When the thin-film magnetic head of this embodiment is used for the vertical magnetic recording scheme, it is possible to use either a two-layered medium or a single-layered medium as the recording medium.

In the thin-film magnetic head of this embodiment, the second magnetic layer 14 has the pole portion layer 14A and the yoke portion layer 14B. The yoke portion layer 14B has a volume sufficient to introduce magnetic flux into the pole portion layer 14A, and the pole portion layer 14A has a saturated magnetic flux density equal to or greater than that of the yoke portion layer 14B. Saturation of magnetic flux halfway through the second magnetic layer 14 is thereby prevented.

Furthermore, in this embodiment, a part of the thin-film coil 10 is disposed between the magnetic layers 8 and 14, and the surface of that part closer to the second magnetic layer 14 is located closer to the first magnetic layer 8 than the end of the gap layer 9 located in the medium facing surface ABS next to the second magnetic layer 14, and also than the upper end of the coupling portion 14C. In addition, the yoke portion layer 14B magnetically connects the upper end of the coupling portion 14C and the rear end surface of the pole portion layer 14A to each other. Accordingly, the yoke portion layer 14B can form a strong magnetic coupling between the coupling portion 14C and the pole portion layer 14A in a short magnetic path.

With these features as described in the foregoing, this embodiment can increase the intensity of magnetic field generated from the magnetic pole portion of the second magnetic layer 14 in the direction perpendicular to the surface of the recording medium, and reduce the magnetic path length, thereby improving the high-frequency characteristics. In particular, when the pole portion layer 14A is formed of a high saturated magnetic flux density material, it is possible to especially increase the intensity of magnetic field in the direction perpendicular to the surface of the recording medium, and it is thereby possible to write data on a recording medium having an enhanced coercivity.

Furthermore, in the thin-film magnetic head of this embodiment, the magnetic field produced in the direction perpendicular to the surface of the recording medium is greater than a magnetic field in the longitudinal direction. Therefore, the magnetic energy produced by the head can be transferred to the recording medium efficiently. Accordingly, this thin-film magnetic head can be made impervious to heat fluctuations of the recording medium, and can thereby increase the linear recording density.

In the thin-film magnetic head of this embodiment, as shown in FIG. 1, it is preferable to dispose the first magnetic layer 8 on the trailing side in the traveling direction T of the recording medium (or on the air-inflow-end side of the slider including the thin-film magnetic head), and to dispose the second magnetic layer 14 on the leading side in the traveling direction T of the recording medium (or on the air-outflow-end side of the slider including the thin-film magnetic head). However, when the thin-film magnetic head of this embodiment is employed for the vertical magnetic recording scheme, the first magnetic layer 8 and the second magnetic layer 14 may be disposed in a manner opposite to that mentioned above.

Furthermore, as shown in FIG. 1, in the thin-film magnetic head of this embodiment the yoke portion layer 14B of the second magnetic layer 14 is shaped so as to form the magnetic path inside thereof, which connects the upper end of the coupling portion 14C and the rear end surface of the pole portion layer 14A in the shortest distance. This can especially reduce the magnetic path length and can thereby improve high-frequency characteristics.

Furthermore, as shown in FIG. 1, in the thin-film magnetic head of this embodiment the distance between the pole portion layer 14A and the first magnetic layer 8 in the medium facing surface ABS is equal to or greater than the thickness of the coupling portion 14C. In addition, the yoke portion layer 14B gradually approaches the first magnetic layer 8 from the portion connected to the rear end surface of the pole portion layer 14A to the portion connected to the coupling portion 14C. It is thereby possible to especially reduce the magnetic path length and to thereby improve high-frequency characteristics.

Furthermore, as shown in FIG. 1, in the thin-film magnetic head of this embodiment, at least part of the yoke portion layer 14B is formed in the shape of an arc that protrudes towards the first magnetic layer 8. This causes part of the yoke portion layer 14B to stay closer to the thin-film coil 10, thereby allowing the magnetic field generated by the thin-film coil 10 to be absorbed efficiently by the yoke portion layer 14B.

Furthermore, as shown in FIG. 4, in the thin-film magnetic head of this embodiment, the portion of the pole portion layer 14A touching the yoke portion layer 14B has a width greater than the width of the pole portion layer 14A measured in the medium facing surface ABS. This allows the portion of the pole portion layer 14A touching the yoke portion layer 14B to be large in area, and thereby makes it possible to prevent a saturation of magnetic flux at this portion. Consequently, it is possible to efficiently introduce the magnetic flux from the yoke portion layer 14B into the pole portion layer 14A. Furthermore, the portion of the pole portion layer 14A exposed in the medium facing surface ABS can be made smaller in area, to make it possible to increase the intensity of magnetic field applied to the recording medium.

Furthermore, as shown in FIG. 1, the thin-film magnetic head of this embodiment has the non-magnetic layer 15 that is in contact with the entirety of the surface of the pole portion layer 14A farther from the gap layer 9. Without the non-magnetic layer 15, the surface of the pole portion layer 14A farther from the gap layer 9 would be damaged when forming the pole portion layer 14A by dry etching or when forming the yoke portion layer 14B by electroplating, which would result in surface irregularities of the order of, for example, 0.1 to 0.3 μm on this surface. Since this embodiment is provided with the non-magnetic layer 15, it is possible to prevent the surface of the pole portion layer 14A farther from the gap layer 9 from being damaged when forming the pole portion layer 14A by dry etching or when forming the yoke portion layer 14B by electroplating, and thereby possible to make the surface flat. Particularly, this embodiment allows the end of the pole portion layer 14A farther from the gap layer 9 to be kept flat in the medium facing surface ABS, since the non-magnetic layer 15 is exposed in the medium facing surface ABS. This allows the magnetic field generated by the pole portion layer 14A in the medium facing surface ABS to be made uniform in the direction intersecting the track. Consequently, it is possible to prevent the bit pattern of the recording medium from being distorted in shape, and to thereby improve the linear recording density.

If the non-magnetic layer 15 is formed of a material having a less etching rate than those of the materials forming the pole portion layer 14A a the portion of the gap layer 9 touching the pole portion layer 14A, it is possible to prevent the surface of the pole portion layer 14A farther from the gap layer 9 from being damaged when forming the pole portion layer 14A by dry etching.

In the thin-film magnetic head of this embodiment, as shown in FIG. 1, part of the thin-film coil 10 is disposed between the first and second magnetic layers 8 and 14, and the part of the coil is located closer to the first magnetic layer 8 than the midpoint between the first and second magnetic layers 8 and 14. This arrangement allows the first magnetic layer 8 that is larger in volume than the second magnetic layer 14 to efficiently absorb the magnetic field produced by the thin-film coil 10. It is thereby possible to increase the absorptivity of magnetic field in the first and second magnetic layers 8 and 14 as compared with the case where the thin-film coil 10 is located closer to the second magnetic layer 14.

As shown in FIG. 1, in the thin-film magnetic head of this embodiment the gap layer 9 comprises: a first portion (the insulating layer 9B) that is made of a material exhibiting fluidity during its formation and is filled at least in between the windings of the thin-film coil 10; and a second portion (the insulating layers 9A, 9C) made of a material having a better resistance to corrosion, rigidity, and insulation property than those of the first portion. The second portion covers the thin-film coil 10 and the first portion, and touches the first magnetic layer 8 and the second magnetic layer 14. The second portion of the gap layer 9 is exposed in the medium facing surface ABS. Although it is difficult to completely fill in the spaces between the windings of the thin-film coil 10 with a non-magnetic material by sputtering, it is made easy by using a non-magnetic material having fluidity like organic materials. Nevertheless, organic materials lack reliability in resistance to dry etching, resistance to corrosion, resistance to heat, rigidity and the like. In this embodiment, as described above, the first portion (the insulating layer 9B) is formed of a material that exhibits fluidity during its formation and is filled in between the windings of the thin-film coil 10. In addition, the second portion (the insulating layers 9A, 9C) is formed of a material having a better resistance to corrosion, rigidity, and insulation property than those of the first portion, the second portion covering the thin-film coil 10 and the first portion, and touching the first magnetic layer 8 and the second magnetic layer 14. Accordingly, it is possible to completely fill the spaces between the windings of the thin-film coil 10 with the non-magnetic material and to thereby increase the reliability of the gap layer 9.

The thin-film magnetic head of this embodiment further comprises the MR element 5 serving as a read element. It is thereby possible to improve the read performance as compared with the case where reading is performed by using an induction-type electromagnetic transducer. Since the MR element 5 is shielded with the shield layers 3 and 6, the resolution of read operations is improved.

Figure 5:
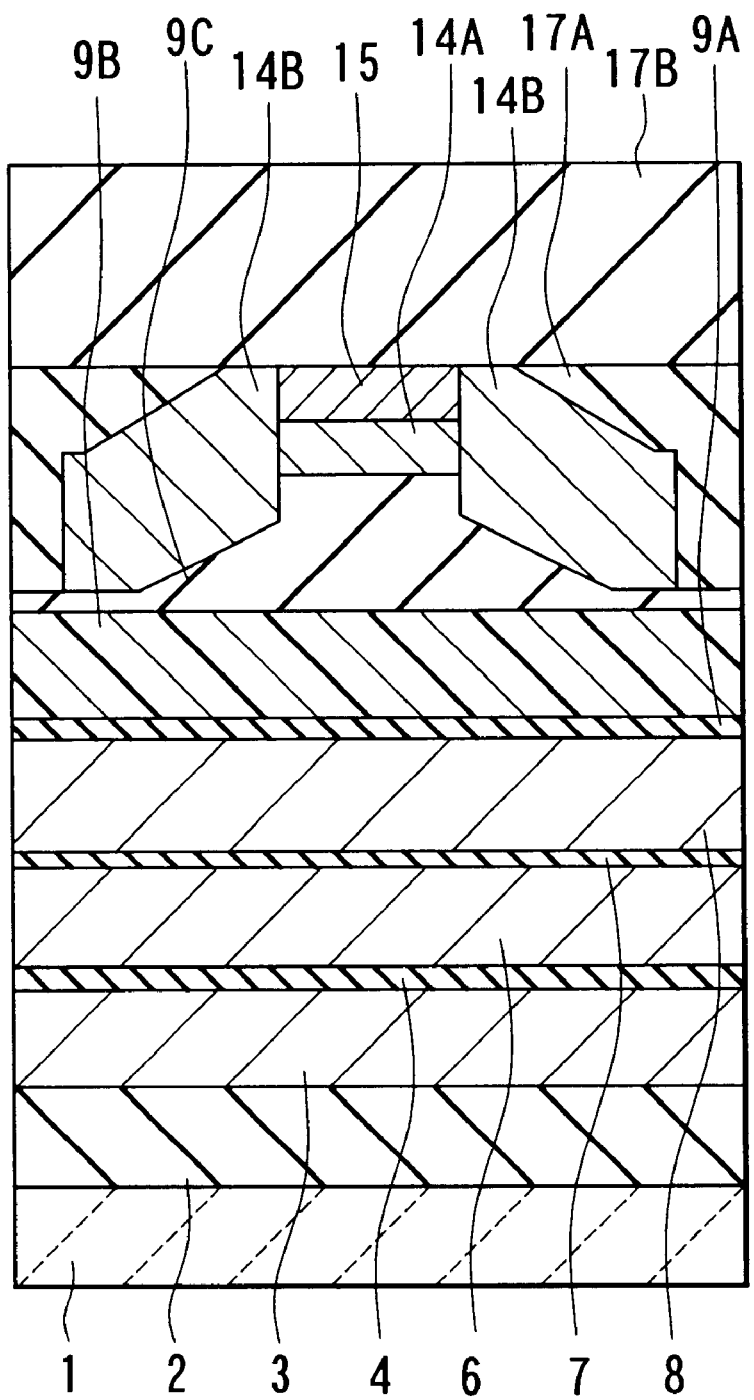
FIG. 5 is a cross-sectional view of a modified example of the first embodiment of the invention, taken along line 2—2 of FIG. 1.
Figure 6:
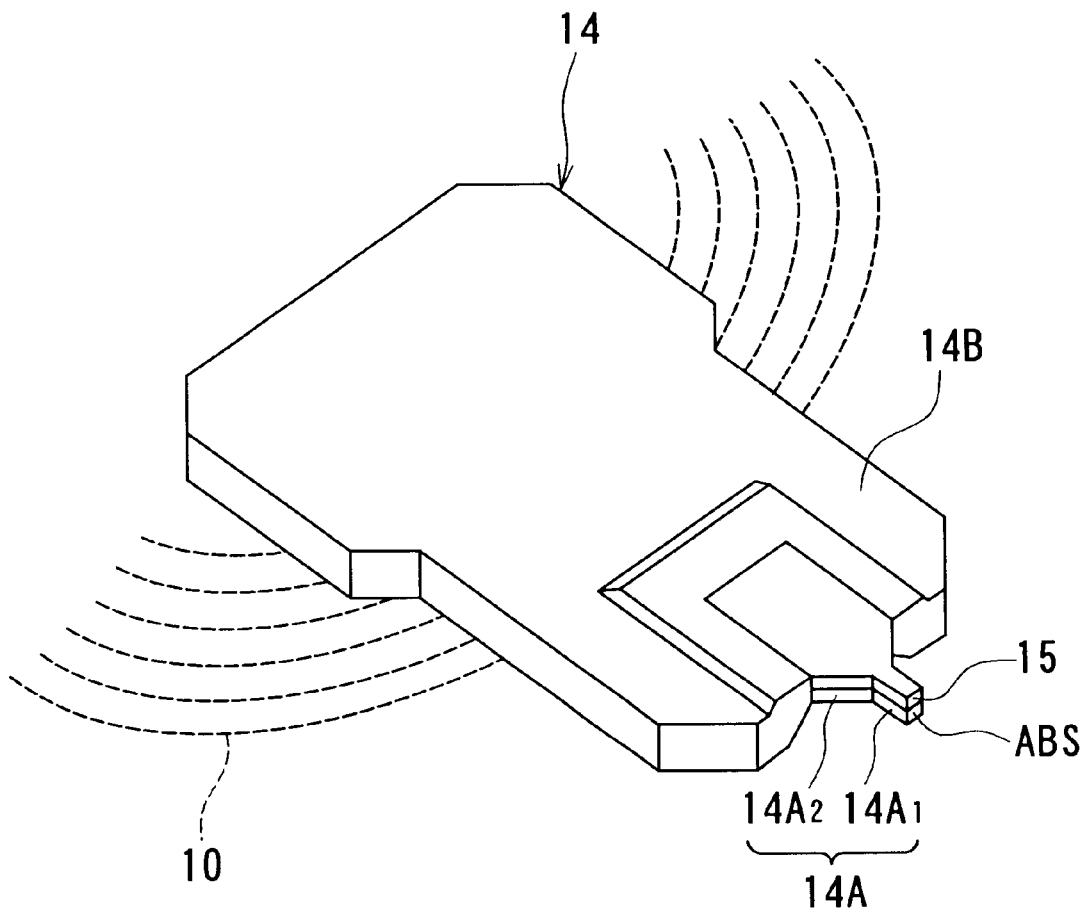
FIG. 6 is a perspective view illustrating the main part of the thin-film magnetic head of the modified example shown in FIG. 5.

Now, a modified example of the thin-film magnetic head of this embodiment will be described with reference to FIGS. 5 and 6. FIG. 5 is a cross-sectional view of the modified example, taken along line 2—2 of FIG. 1. FIG. 6 is a perspective view illustrating the main part of the thin-film magnetic head of the modified example. In the modified example, the yoke portion layer 14B is magnetically connected to the pole portion layer 14A not only at the rear end surface of the pole portion layer 14A but also at both side surfaces of the pole portion layer 14A in the width direction. This modified example allows to obtain a greater area of a connecting portion where the yoke portion layer 14B and the pole portion layer 14A are connected to each other, even if the pole portion layer 14A is small in volume, and thereby prevents magnetic flux from being saturated at this connecting portion. Consequently, it is possible to efficiently introduce the magnetic flux from the yoke portion layer 14B into the pole portion layer 14A, and to thereby increase the intensity of magnetic field applied to the recording medium.

As shown in FIG. 6, in this modified example the end of the yoke portion layer 14B closer to the medium facing surface ABS is located at a distance from the medium facing surface ABS. This makes it possible to prevent the magnetic field, produced from the end of the yoke portion layer 14B closer to the medium facing surface ABS, from causing writing of information onto the recording medium.

The method of manufacturing the thin-film magnetic head according to this embodiment will be described later, together with the method of manufacturing thin-film magnetic heads of second and third embodiments, after the structure of the thin-film magnetic head of the third embodiment is described.

[Second Embodiment]

Figure 7:
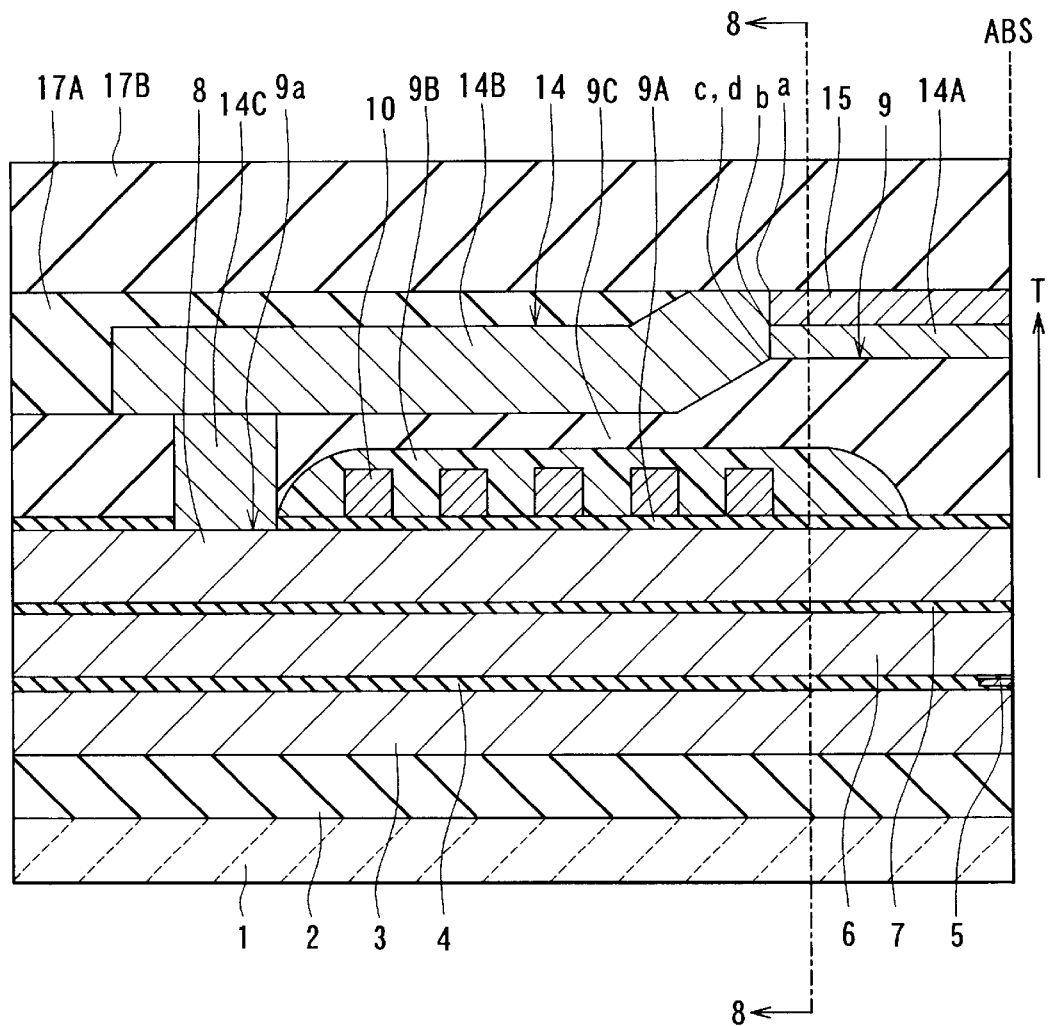
FIG. 7 is a cross-sectional view illustrating a structure of a thin-film magnetic head according to a second embodiment of the invention.
Figure 8:
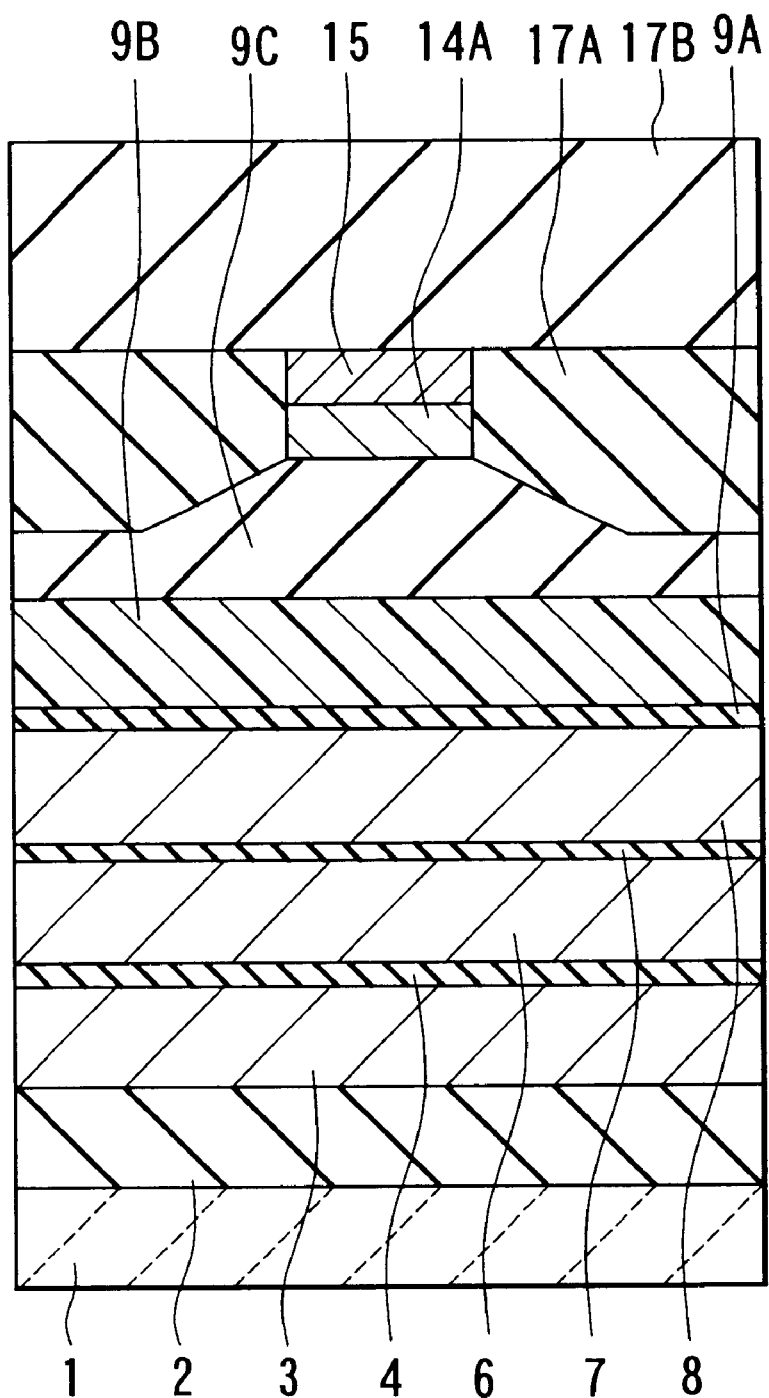
FIG. 8 is a cross-sectional view taken along line 8—8 of FIG. 7.
Figure 9:
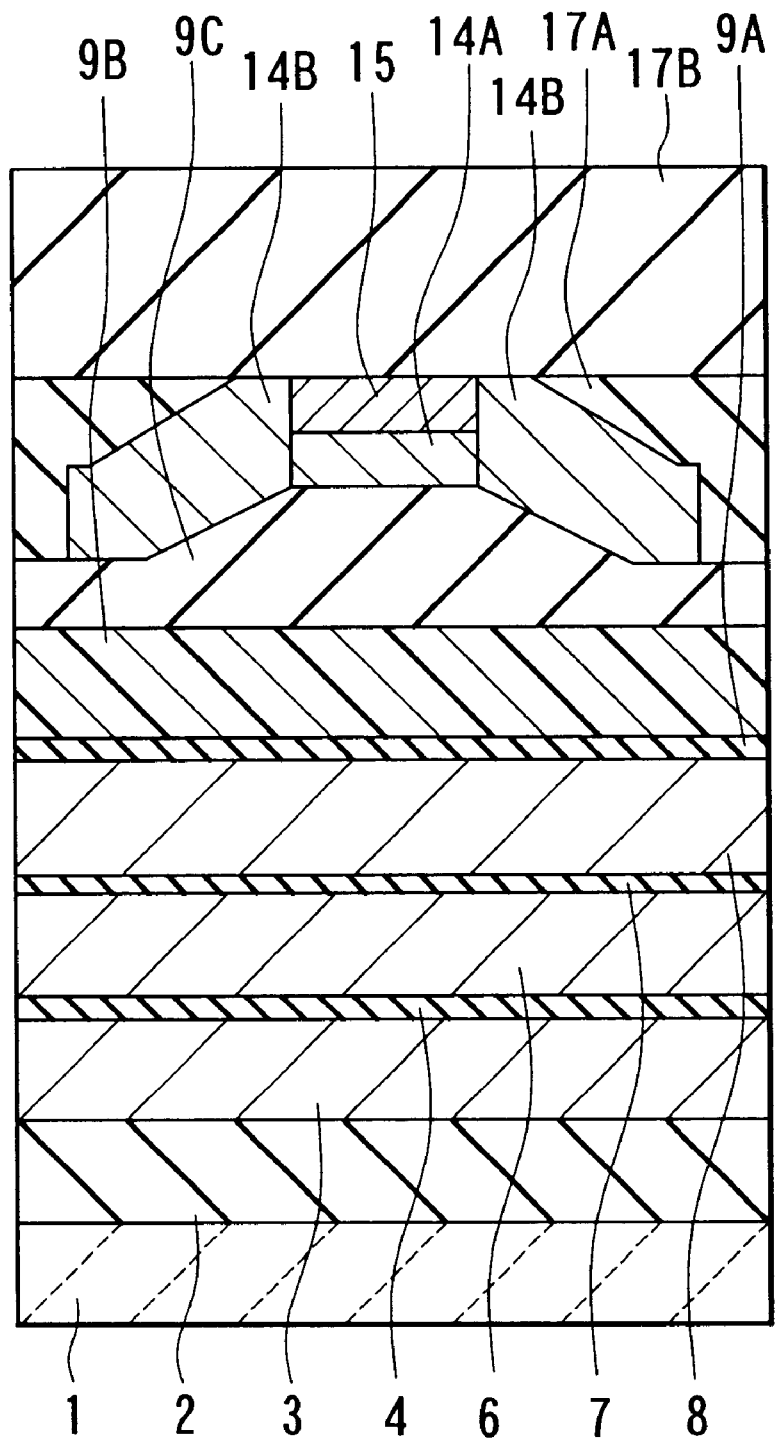
FIG. 9 is a cross-sectional view of a modified example of the second embodiment of the invention, taken along line 8—8 of FIG. 7.
Figure 10:
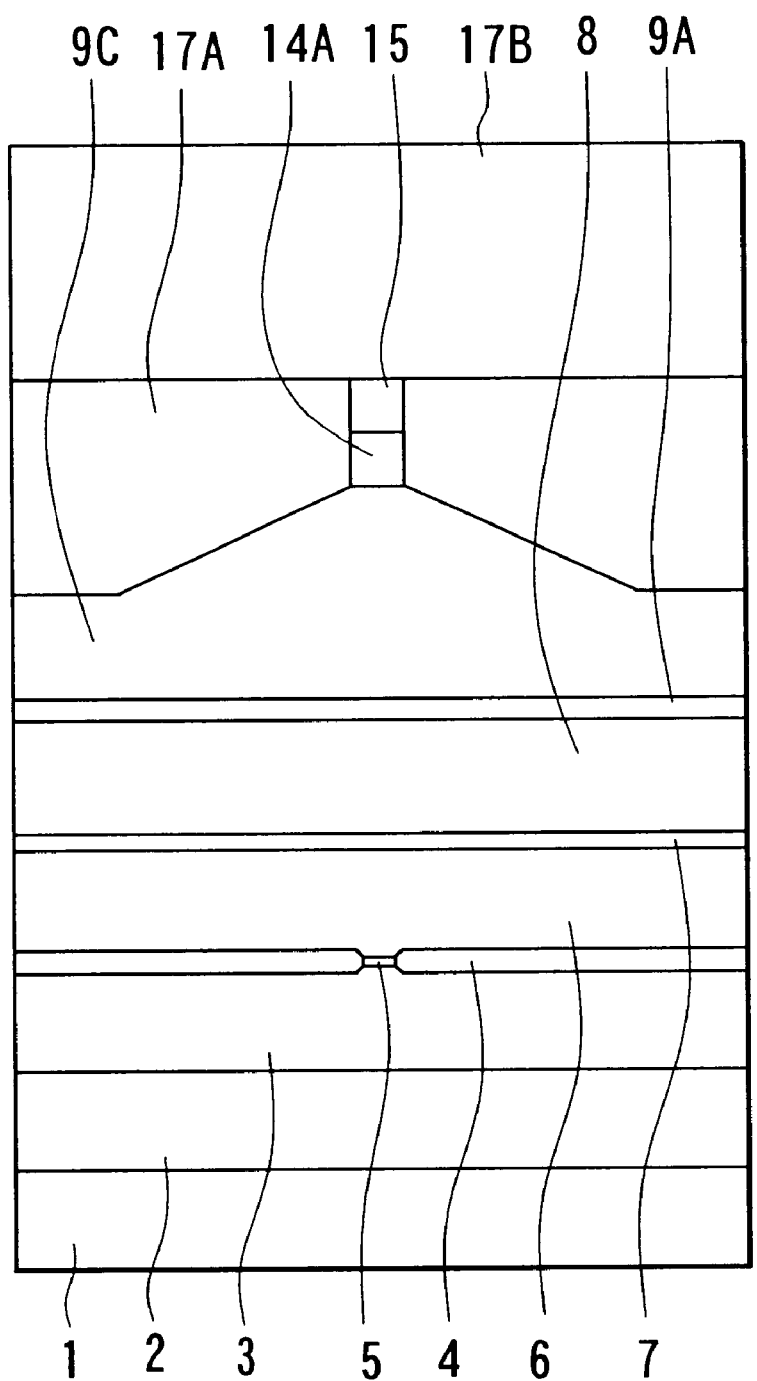
FIG. 10 is a front view illustrating the medium facing surface of the thin-film magnetic head according to the second embodiment of the invention.

Now, the thin-film magnetic head of the second embodiment of the invention will be described. FIG. 7 is a cross-sectional view illustrating the structure of the thin-film magnetic head of this embodiment. FIG. 7 shows a cross section orthogonal to the medium facing surface and the surface of the substrate. In addition, the arrow indicated by symbol T in FIG. 7 shows the traveling direction of the recording medium. FIG. 8 is a cross-sectional view taken along line 8—8 of FIG. 7. FIG. 9 is a cross-sectional view of a modified example of this embodiment, taken along line 8—8 of FIG. 7. FIG. 10 is a front view illustrating the medium facing surface of the thin-film magnetic head shown in FIG. 7.

As shown in FIG. 7, in the cross section containing the interface between the yoke portion layer 14B and the pole portion layer 14A, the yoke portion layer 14B has a non-contact portion (corresponding to the line segment ab in FIG. 7) that is not in contact with the pole portion layer 14A. In this embodiment, the non-contact portion is located only on the side of the non-magnetic layer 15 relative to the pole portion layer 14A. In other words, Point c and Point d coincide. The remainder of the structure of the thin-film magnetic head of this embodiment is the same as that of the head of the first embodiment. In the modified example shown FIG. 9, the yoke portion layer 14B is magnetically connected to the pole portion layer 14A not only at the rear end surface of the pole portion layer 14A but also at both side surfaces of the pole portion layer 14A in the width direction, like the modified example of the first embodiment.

According to this embodiment, in the cross section containing the interface between the yoke portion layer 14B and the pole portion layer 14A, the magnetic flux passing through the end of the yoke portion layer 14B closer to the gap layer 9 (corresponding to Point d in FIG. 7) mostly flows into the pole portion layer 14A. Therefore, as compared with the first embodiment, this embodiment can reduce the magnetic flux coming from the yoke portion layer 14B to the first magnetic layer 8 not via the pole portion layer 14A but via the gap layer 9, and makes it possible to introduce the magnetic flux from the yoke portion layer 14B into the pole portion layer 14A with improved efficiency.

The remainder of the functions and effects of this embodiment are similar to those of the first embodiment.

[Third Embodiment]

Figure 11:
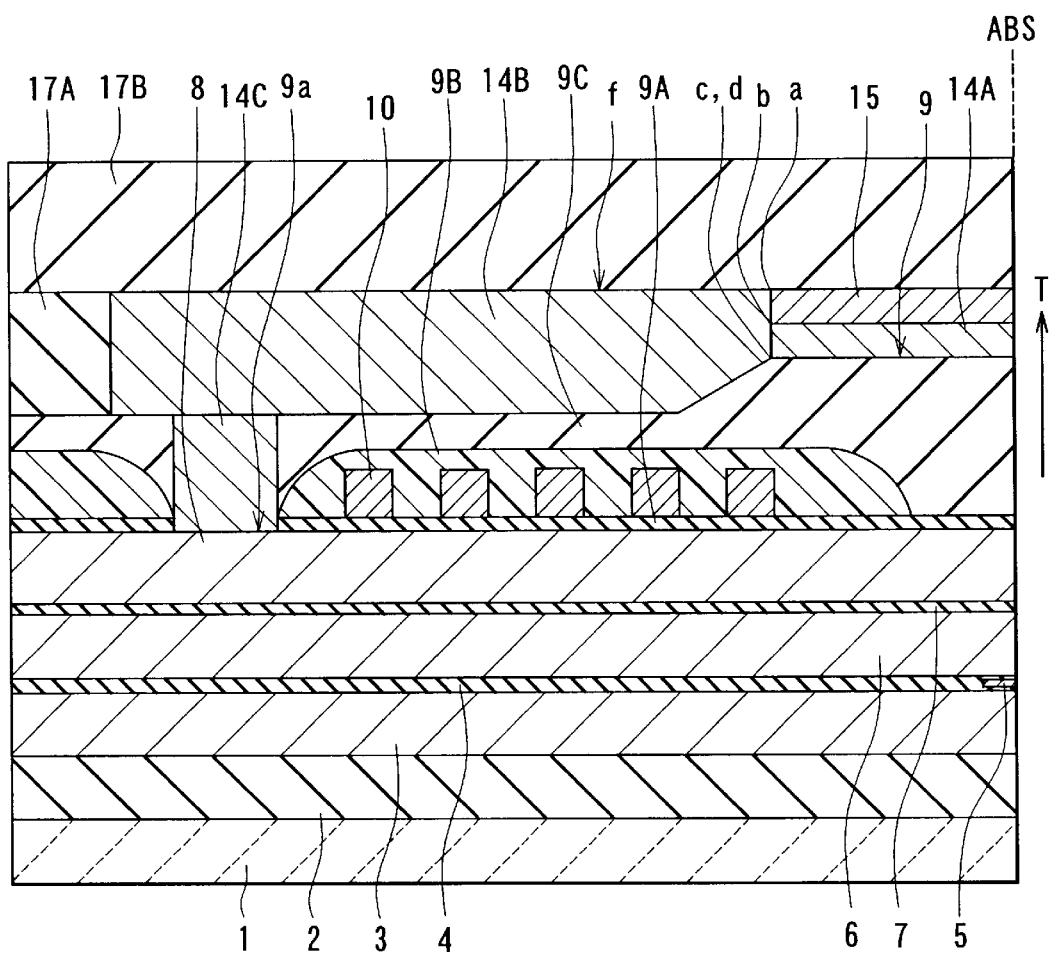
FIG. 11 is a cross-sectional view illustrating a structure of a thin-film magnetic head according to a third embodiment of the invention.

Now, the thin-film magnetic head of the third embodiment of the invention will be described. FIG. 11 is a cross-sectional view illustrating the structure of the thin-film magnetic head of this embodiment. FIG. 11 shows a cross section orthogonal to the medium facing surface and the surface of the substrate. In addition, the arrow indicated by symbol T in FIG. 11 shows the traveling direction of the recording medium.

In this embodiment, the entirety of the surface of the yoke portion layer 14B farther from the gap layer 9 is flattened together with the surface of the non-magnetic layer 15 farther from the gap layer 9 and the top surface of the protective layer 17A. In this embodiment, the thickness of the yoke portion layer 14B gradually decreases as the distance from the pole portion layer 14A decreases. Accordingly, in the yoke portion layer 14B, the intensity of magnetic field increases as the distance from the pole portion layer 14A decreases, resulting in the maximum intensity at the portion touching the rear end surface of the pole portion layer 14A. Therefore, this embodiment makes it possible to introduce magnetic flux efficiently from the yoke portion layer 14B into the pole portion layer 14A.

The remainder of the structure, functions and effects of this embodiment are similar to those of the second embodiment including its modified example. In this embodiment, the positional relationship between the yoke portion layer 14B and the pole portion layer 14A in the cross section containing the interface between the yoke portion layer 14B and the pole portion layer 14A may be made the same as that of the first embodiment.

Now, the method of manufacturing the thin-film magnetic heads of the first to third embodiments will be described with reference to FIG. 12 to FIG. 21. The substrate 1 up to the non-magnetic layer 7 are omitted in FIG. 12 to FIG. 21.

According to the method of manufacturing the thin-film magnetic heads of the first to third embodiments, the insulating layer 2 is first formed on the substrate 1. Then, the bottom shield layer 3 is formed on the insulating layer 2. Then, an insulating film to be a part of the insulating layer 4 is formed on the bottom shield layer 3. On this insulating film, formed are the MR element 5 and leads (not shown) to be connected to the MR element 5. Then, the MR element 5 and the leads are covered with another insulating film that makes the other part of the insulating layer 4, and the MR element 5 and the leads are embedded in the insulating layer 4.

Then, the top shield layer 6 is formed on the insulating layer 4, and the non-magnetic layer 7 is formed on the top shield layer 6. Then, on the non-magnetic layer 7, the first magnetic layer 8 is formed to have a predetermined shape. Then, although not shown, the non-magnetic layer 7 and the first magnetic layer 8 are covered with a non-magnetic material such as alumina. The non-magnetic material is polished to expose the first magnetic layer 8, and the top surface of the first magnetic layer 8 is flattened.

Figure 12:
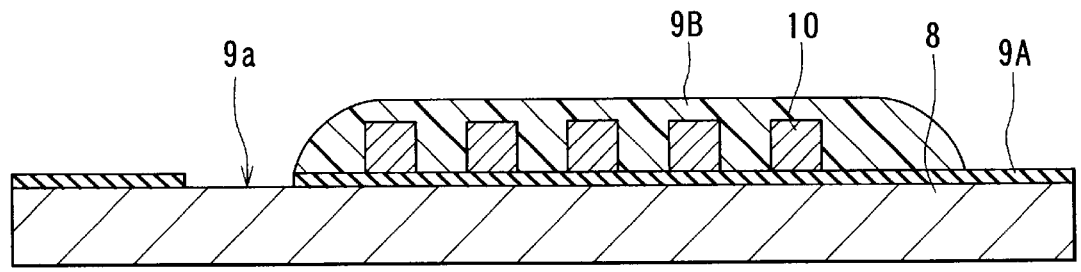
FIG. 12 is a cross-sectional view illustrating a step of a method of manufacturing the thin-film magnetic heads according to the first to third embodiments of the invention.

Then, as shown in FIG. 12, a non-conductive and non-magnetic material such as alumina is sputtered onto the first magnetic layer 8 to form the insulating layer 9A. Subsequently, through the use of a known photolithography technique and dry etching, the contact hole 9a is formed in the insulating layer 9A where the coupling portion 14C is to be formed. The thin-film coil 10 is then formed on the insulating layer 9A with a known photolithography technique and a known deposition technique (e.g., electroplating). Then, the insulating layer 9B is formed with a known photolithography technique to fill at least spaces between the windings of the thin-film coil 10.

Figure 13:
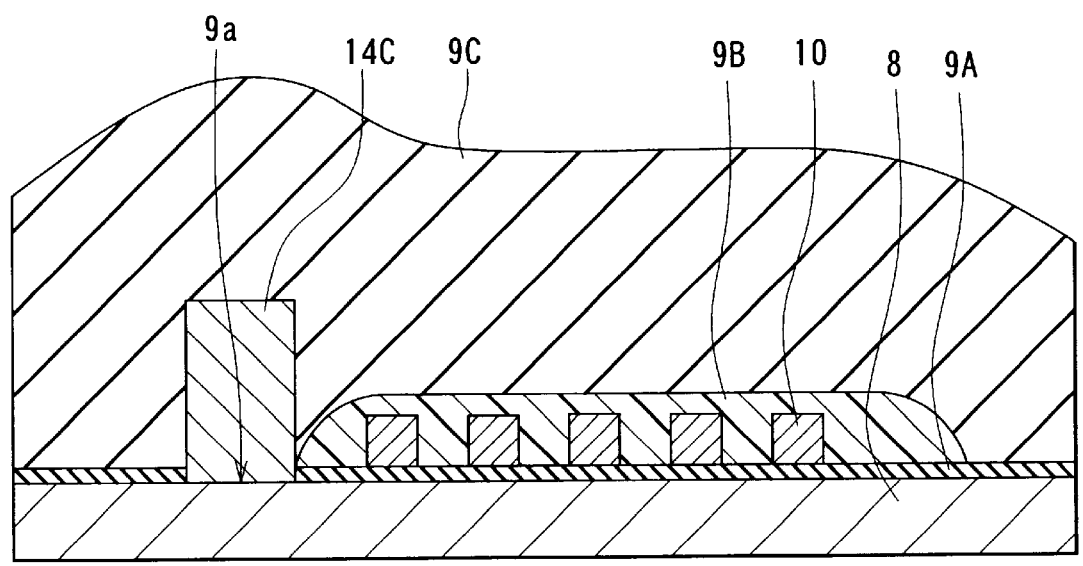
FIG. 13 is a cross-sectional view illustrating a step that follows FIG. 12.

Then, as shown in FIG. 13, with a known photolithography technique and a known deposition technique (e.g., electroplating), the coupling portion 14C is formed on the first magnetic layer 8 where the contact hole 9a is formed. For example, the coupling portion 14C has a thickness of 2 to 4 µm. The insulating layer 9C is then formed by sputtering, so as to cover the thin-film coil 10, the insulating layer 9A, the insulating layer 9B and the coupling portion 14C. At this stage, the insulating layer 9C may have a thickness sufficiently enough to cover the coupling portion 14C, and the thickness may be 5 µm, for example.

Figure 14:
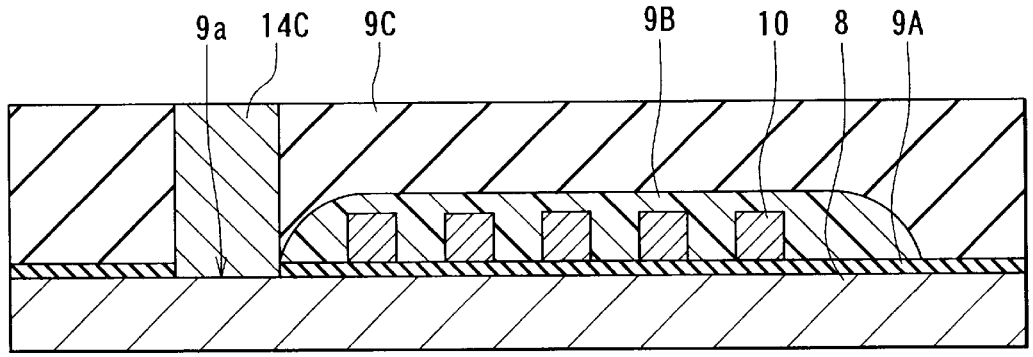
FIG. 14 is a cross-sectional view illustrating a step that follows FIG. 13.

Then, as shown in FIG. 14, the surface of the insulating layer 9C is polished by chemical mechanical polishing, for example, so that the coupling portion 14C is exposed, and the top surfaces of the insulating layer 9C and the coupling portion 14C are flattened. At this stage, the distance from the top surface of the first magnetic layer 8 to the top surface of the insulating layer 9C and the coupling portion 14C is 2 to 4 µm, for example. The coupling portion 14C is not necessarily required to be exposed at this stage, but may be exposed in a later step. The total thickness of the insulating layer 9A and the insulating layer 9C in the medium facing surface is a gap length of the write head (induction-type electromagnetic transducer).

Figure 15:
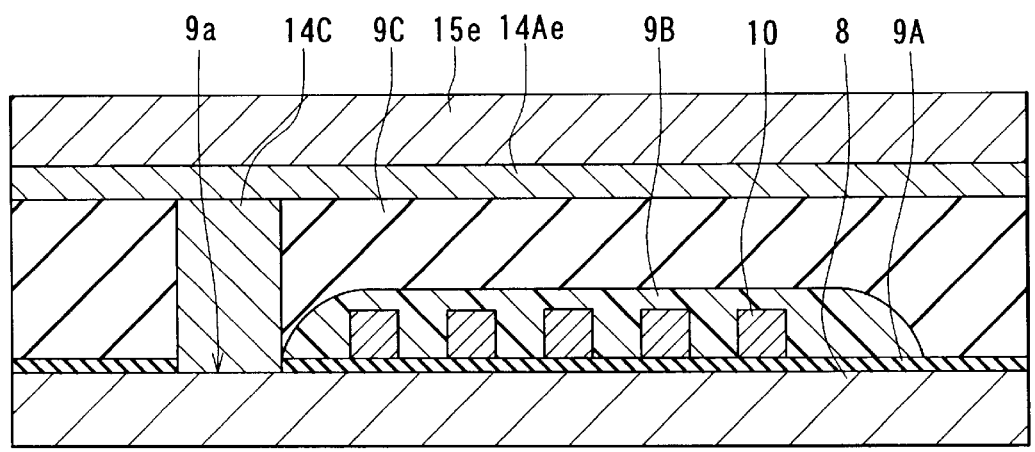
FIG. 15 is a cross-sectional view illustrating a step that follows FIG. 14.

Then, as shown in FIG. 15, on the insulating layer 9C and the coupling portion 14C, a layer 14Ae to be etched is formed of a material for forming the pole portion layer 14A. The layer 14Ae preferably has a thickness of 0.1 to 0.8 µm, and more preferably a thickness of 0.3 to 0.8 µm. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, a non-magnetic layer 15e is formed on the layer 14Ae. The non-magnetic layer 15e is preferably equal to or less than 0.5 µm in thickness.

Then, although not illustrated, an electrode layer for electroplating is formed by sputtering on the non-magnetic layer 15e. The electrode layer is equal to or less than 0.1 µm in thickness and made of an iron-nickel alloy, for example.

Figure 16:
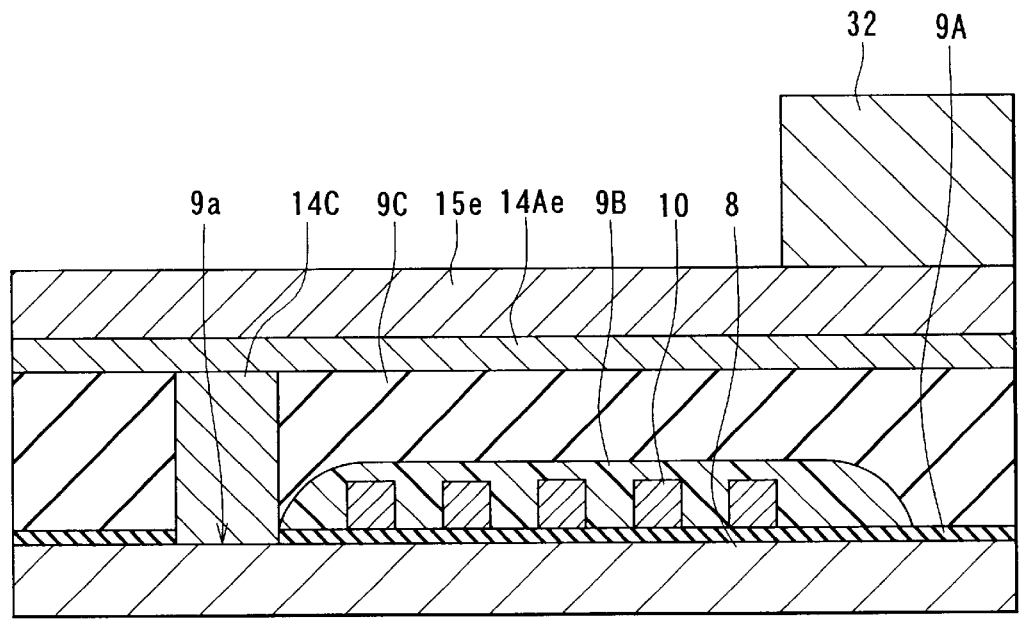
FIG. 16 is a cross-sectional view illustrating a step that follows FIG. 15.

Then, as shown in FIG. 16, a mask 32 for defining the shapes of the pole portion layer 14A and the non-magnetic layer 15 is formed on the aforementioned electrode layer. The mask 32 is 1 to 4 µm in thickness and made of a material such as an iron-nickel alloy. The material of the mask 32 preferably has a good resistance to dry etching that will be carried out later. If an iron-nickel alloy is used as the material of the mask 32, frame plating, for example, is employed for forming the mask 32. Alternatively, a photoresist may be used to form the mask 32. In this case, photolithography is employed to form the mask 32.

Figure 17:
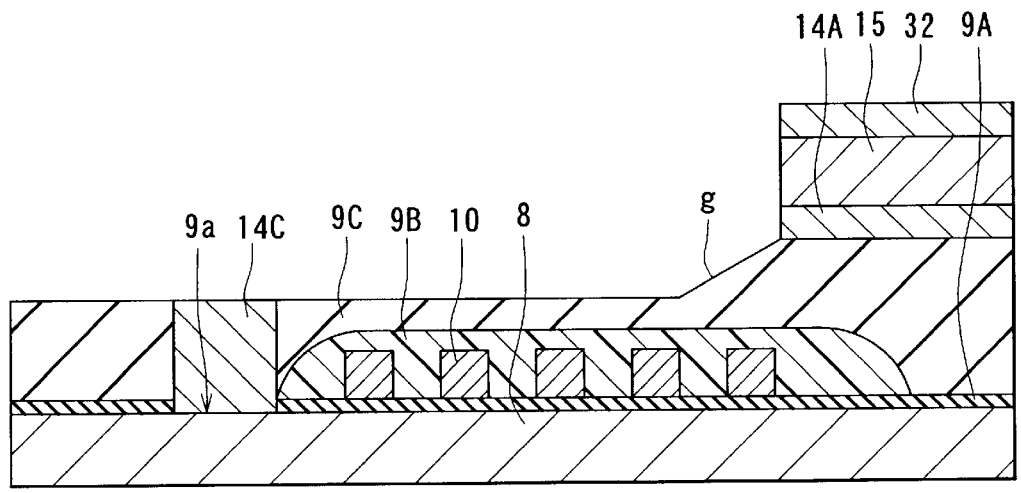
FIG. 17 is a cross-sectional view illustrating a step that follows FIG. 16.

Next, as shown in FIG. 17, using the mask 32, the non-magnetic layer 15e and the layer 14Ae are etched by dry etching such as ion milling to define the outer shapes of the non-magnetic layer 15 and the pole portion layer 14A. Also, through this etching, the width of the pole portion layer 14 in the medium facing surface may be defined so as to agree with the specification of the track width.

To manufacture the thin-film magnetic head of the second embodiment, the etching may be stopped when the upper end of slope g of the insulating layer 9C shown in FIG. 17 coincides with the position of the intersection of the rear end surface of the pole portion layer 14A and the surface of the pole portion layer 14A closer to the gap layer 9. To manufacture the thin-film magnetic head of the first embodiment, the etching may be carried out until the upper end of the slope g of the insulating layer 9C is located on the side of the gap layer 9 relative to the position of the intersection of the rear end surface of the pole portion layer 14A and the surface of the pole portion layer 14A closer to the gap layer 9.

After the aforementioned etching, the mask 32 may be allowed to remain if it is non-magnetic and sufficiently reliable in resistance to corrosion or the like, or may be removed if unnecessary.

Through the aforementioned etching, the outer shapes of the non-magnetic layer 15 and the pole portion layer 14A are defined and the coupling portion 14C is exposed. In order for the coupling portion 14C to be exposed at this stage, the coupling portion 14C should previously have a greater thickness than desired.

Then, although not shown, an electrode layer for electroplating is formed by sputtering on the non-magnetic layer 15, the insulating layer 9C and the coupling portion 14C. The electrode layer may have a thickness of 0.1 µm or less, and may be formed of an iron-nickel alloy, with Ti (titanium) deposited to underlie the electrode layer.

Figure 18:
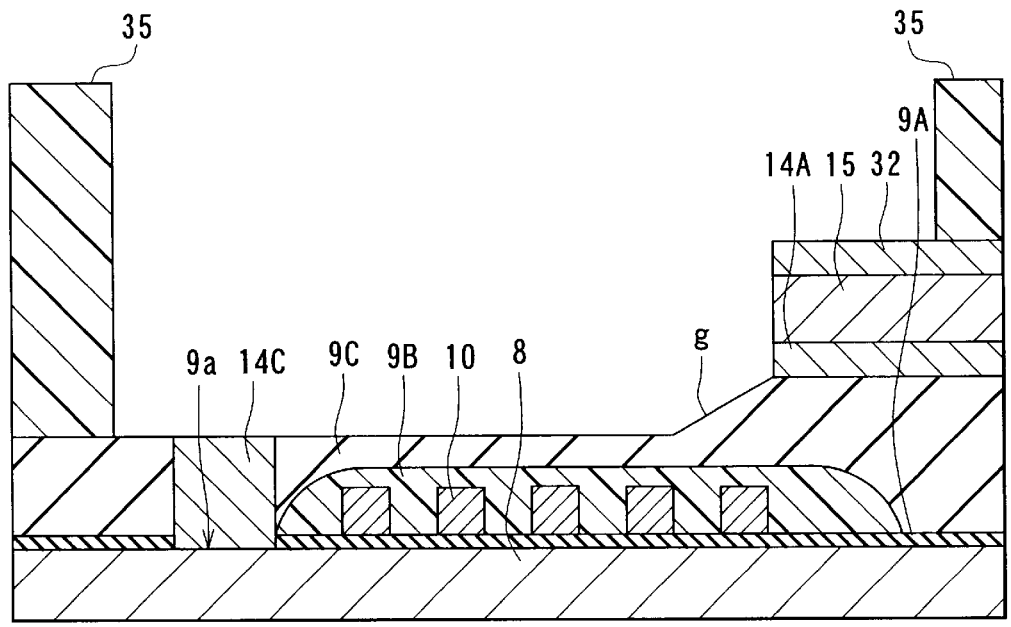
FIG. 18 is a cross-sectional view illustrating a step that follows FIG. 17.

Then, as shown in FIG. 18, a resist frame 35 having a gap portion corresponding to the shape of the yoke portion layer 14B is formed of a photoresist on the aforementioned electrode layer.

Figure 19:
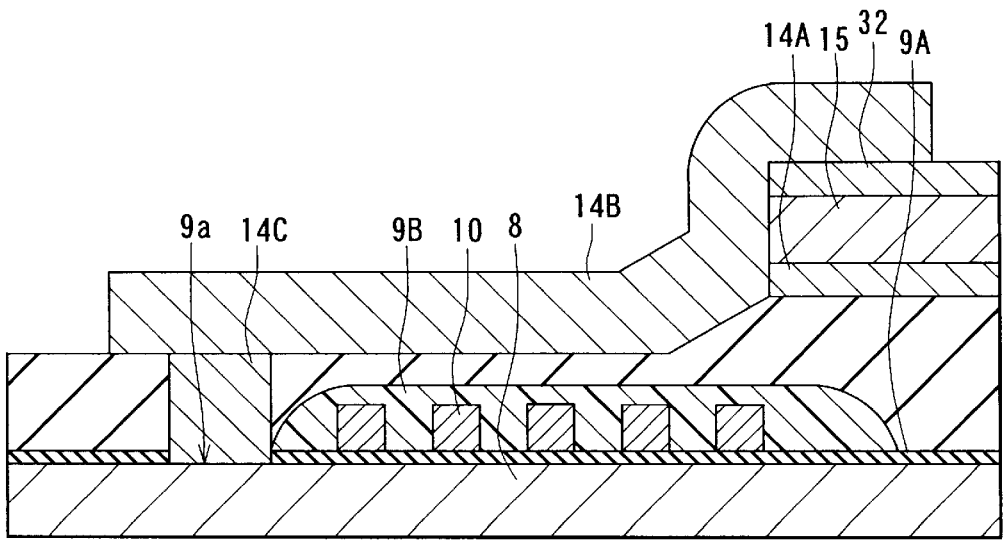
FIG. 19 is a cross-sectional view illustrating a step that follows FIG. 18.

Then, as shown in FIG. 19, using the resist frame 35, the yoke portion layer 14B is formed on the electrode layer by electroplating (frame plating). The resist frame 35 is then removed. Although the yoke portion layer 14B can be formed using the lift-off method, electroplating is most preferably used to allow the shape of the yoke portion layer 14B to follow the shape of the base thereof.

Then, although not shown, the electrode layer, except for the portion underlying the yoke portion layer 14B, is removed by dry etching.

Figure 20:
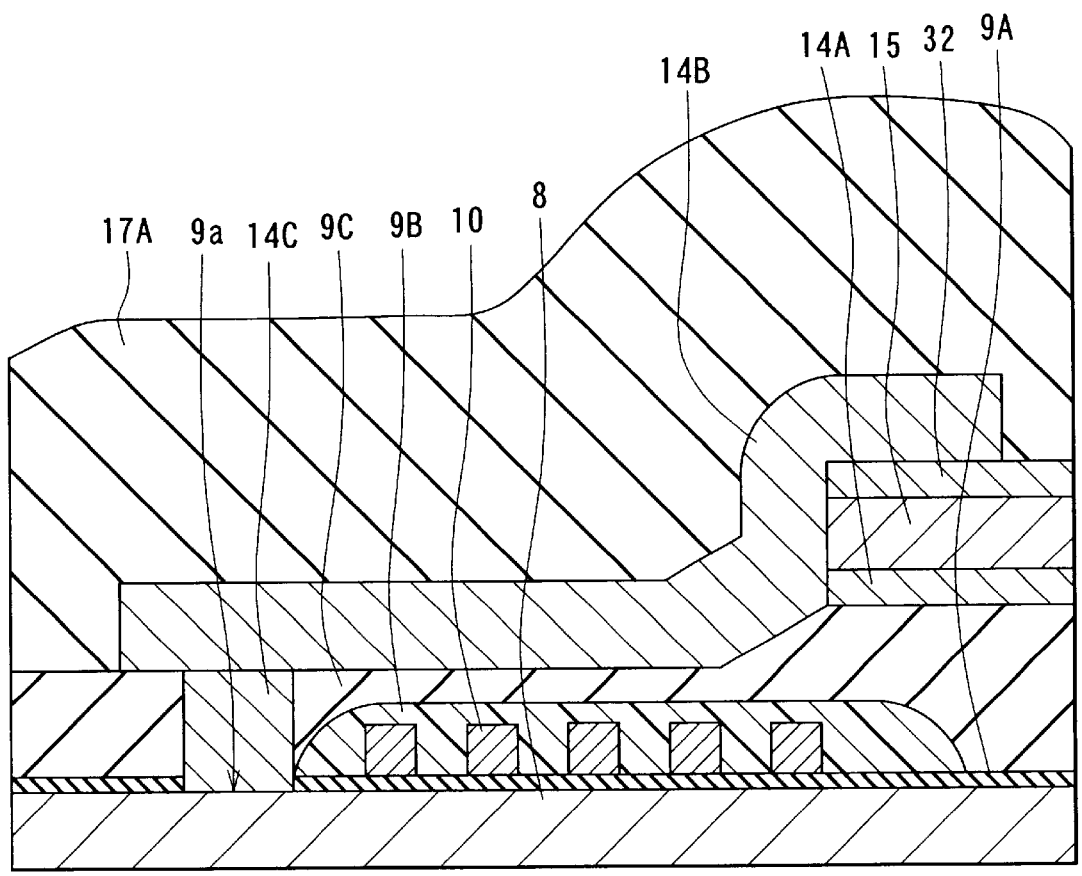
FIG. 20 is a cross-sectional view illustrating a step that follows FIG. 19.

Then, as shown in FIG. 20, the protective layer 17A is formed to cover the non-magnetic layer 15 and the yoke portion layer 14B. It is preferable that the thickness of the protective layer 17A is 1.5 to 2 times the difference in height of the irregularities of the layered surface.

Figure 21:
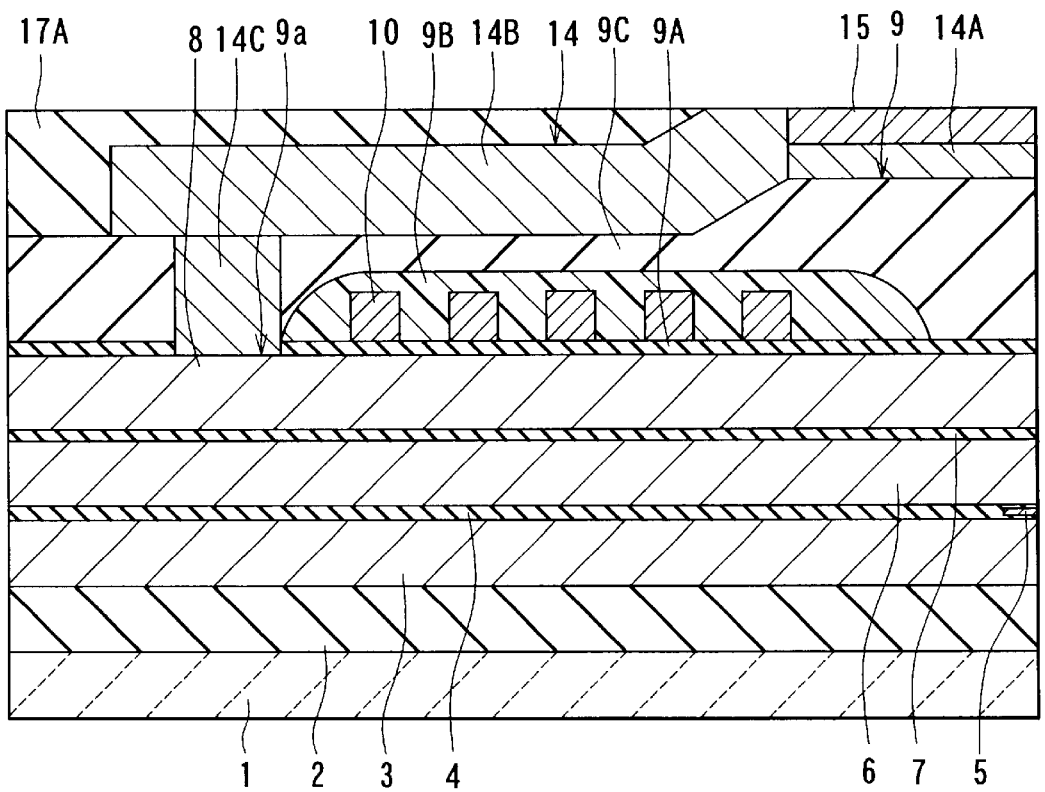
FIG. 21 is a cross-sectional view illustrating a step that follows FIG. 20.

Then, as shown in FIG. 21, the protective layer 17A is polished by chemical mechanical polishing, for example, so that the non-magnetic layer 15 is exposed, and, at least the vicinity of a part of the surface of the yoke portion layer 14B farther from the gap layer 9, the part being magnetically connected to the pole portion layer 14A, is flattened together with the surface of the non-magnetic layer 15 farther from the gap layer 9 and with the top surface of the protective layer 17A.

In FIG. 21, only part of the surface of the yoke portion layer 14B farther from the gap layer 9 is exposed from the protective layer 17A. However, the yoke portion layer 14B may be increased in thickness enough to allow the entirety of its surface farther from the gap layer 9 to be exposed from the protective layer 17A. This makes the thin-film magnetic head of the third embodiment.

Then, as shown in FIG. 1, FIG. 7 or FIG. 11, the protective layer 17B is formed to cover the entirety of the layered surface. Then, through the steps of forming leads, terminals and the like on the protective layer 17B, cutting the substrate for each slider, polishing the medium facing surface ABS, preparing rails for flying and so on, the thin-film magnetic head is completed.

The method of manufacturing the thin-film magnetic heads of the first to third embodiments can provide the following functions and effects in addition to those provided by the thin-film magnetic head of each of the embodiments.

For each embodiment, the step of forming the pole portion layer 14A includes the steps of: forming the layer 14Ae to be etched, made of a material for forming the pole portion layer 14A, on the gap layer 9 and the coupling portion 14C; and defining the outer shape of the pole portion layer 14A while exposing the coupling portion 14C by selectively etching the layer 14Ae by dry etching. In each embodiment, the layer 14Ae is etched by dry etching, so as to define the shape of the base of the yoke portion layer 14B such that the base has a gentle slope from the rear end surface of the pole portion layer 14A to the upper end of the coupling portion 14C. Accordingly, by forming the yoke portion layer 14B on this base, it is possible to form the magnetic path that connects the coupling portion 14C and the pole portion layer 14A in the shortest distance.

In each embodiment, if the top surface of the layer 14Ae is flattened by polishing after the step of forming the layer 14Ae, the end of the pole portion layer 14A farther from the gap layer 9 can be completely made flat in the medium facing surface ABS. This allows the magnetic field produced from the pole portion layer 14A in the medium facing surface ABS to be made uniform in the direction intersecting the track. Consequently, it is possible to prevent the bit pattern of the recording medium from being distorted, and to thereby improve the linear recording density.

Furthermore, in each embodiment, the top surfaces of the insulating layer 9C to be a base of the layer 14Ae and the coupling portion 14C are flattened by polishing before the step of forming the layer 14Ae. This allows the end of the pole portion layer 14A closer to the gap layer 9 to be made flat in the medium facing surface ABS. If the layer 14Ae is formed by sputtering, a good uniformity in thickness of the layer 14Ae as deposited can be obtained, so that the end of the pole portion layer 14A farther from the gap layer 9 can also be made flat in the medium facing surface ABS. As a result, the magnetic field produced from the pole portion layer 14A in the medium facing surface ABS can be made uniform in the direction intersecting the track. Consequently, it is possible to prevent the bit pattern of the recording medium from being distorted, and to thereby improve the linear recording density.

Furthermore, in each embodiment, the step of forming the pole portion layer 14A includes: forming the layer 14Ae to be etched; forming the non-magnetic layer 15e on the layer 14Ae; forming the mask 32 corresponding to the shape of the pole portion layer 14A on the non-magnetic layer 15e; and etching the non-magnetic layer 15e and the layer 14Ae using the mask 32, thereby defining the outer shape of the pole portion layer 14A. Therefore, the outer shape of the pole portion layer 14A can be defined with the top surface of the layer 14Ae being protected by the non-magnetic layer 15e. This makes it possible to maintain the flatness of the end of the pole portion layer 14A farther from the gap layer 9.

Furthermore, in each embodiment, if the mask 32 is used which has a good resistance to dry etching, it is possible to define the outer shape of the pole portion layer 14A by dry etching using the mask 32, even when the pole portion layer 14A is made of a material that has a good resistance to dry etching.

In the step of forming the yoke portion layer 14B in each embodiment, electroplating may be employed to form the yoke portion layer 14B. In this case, the yoke portion layer 14B can be formed easily into a shape that well follows the shape of the base thereof.

[Fourth Embodiment]

Figure 22:
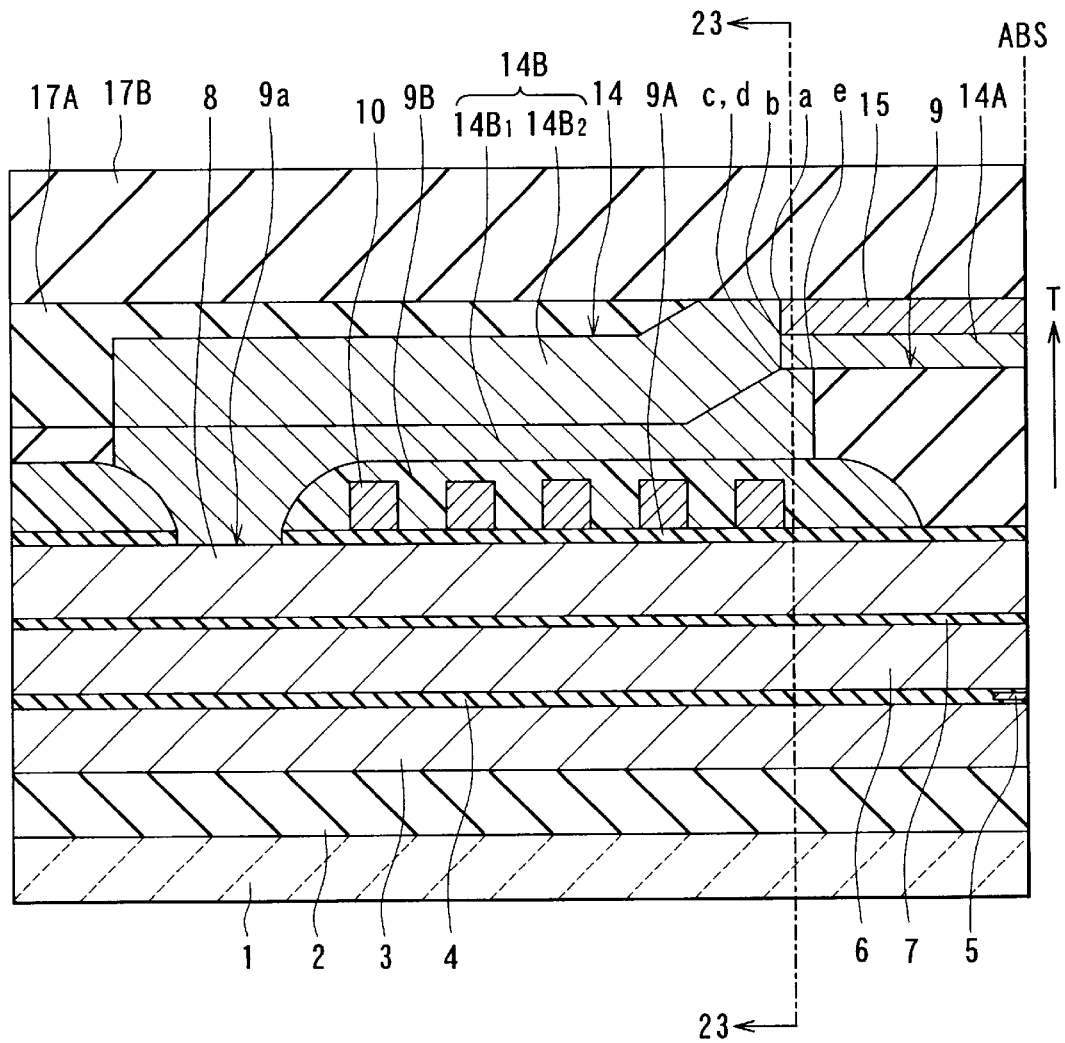
FIG. 22 is a cross-sectional view illustrating a structure of a thin-film magnetic head according to a fourth embodiment of the invention.
Figure 23:
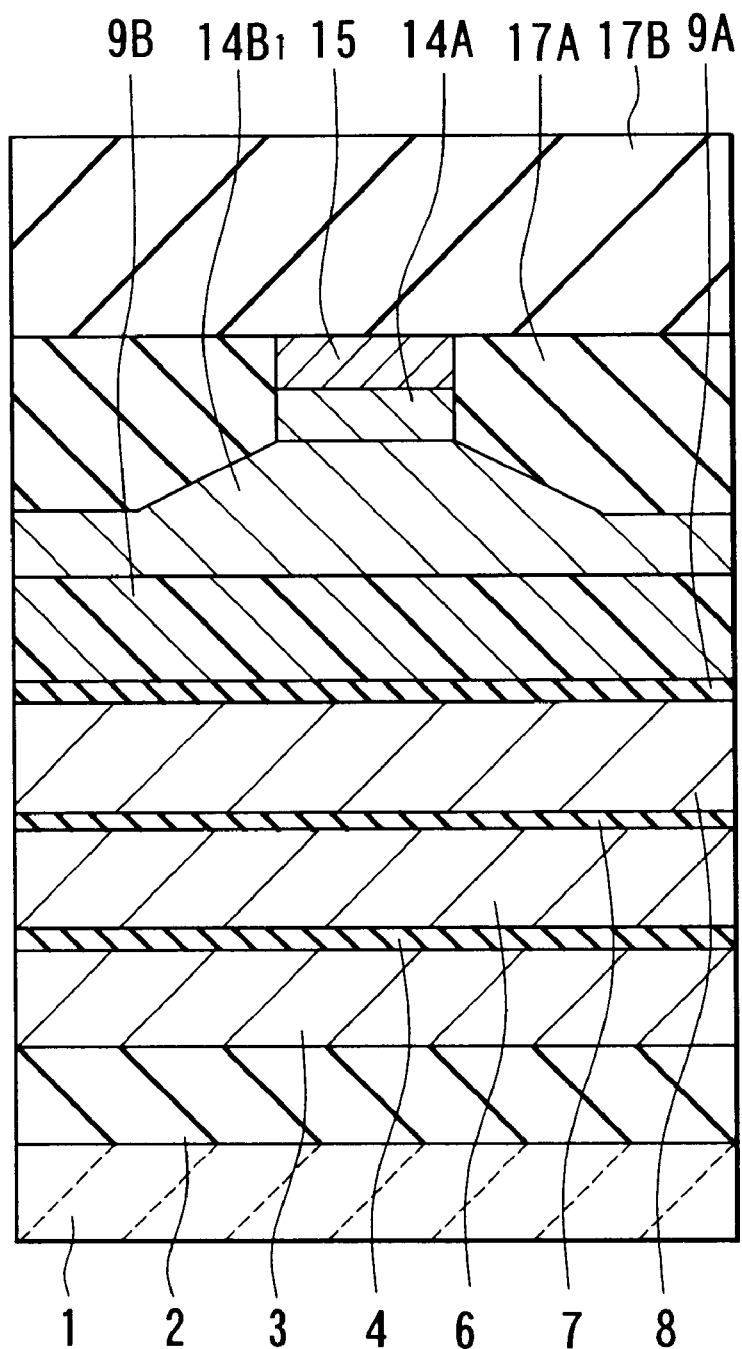
FIG. 23 is a cross-sectional view taken along line 23—23 of FIG. 22.
Figure 24:
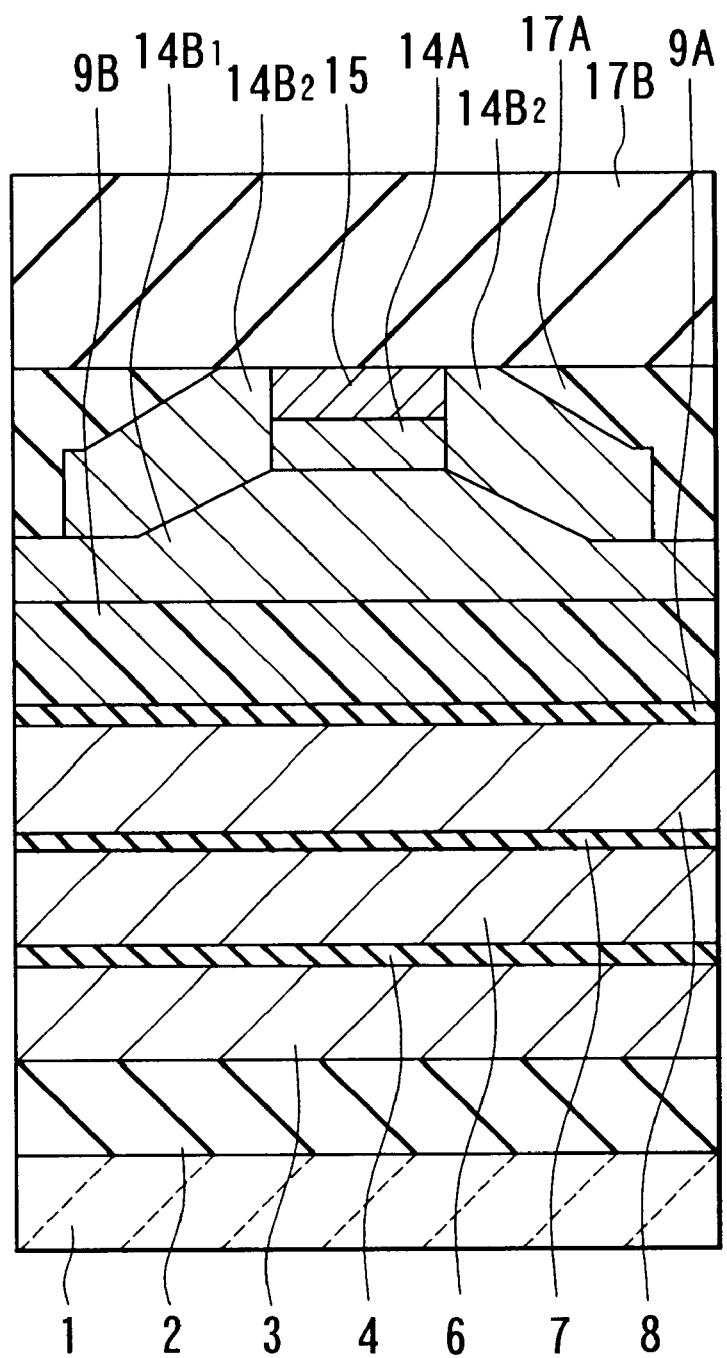
FIG. 24 is a cross-sectional view of a modified example of the fourth embodiment of the invention, taken along line 23—23 of FIG. 22.

Now, a thin-film magnetic head of a fourth embodiment of the invention will be described. FIG. 22 is a cross-sectional view illustrating the structure of the thin-film magnetic head of this embodiment. FIG. 22 shows a cross section orthogonal to the medium facing surface and the surface of the substrate. In addition, the arrow indicated by symbol T in FIG. 22 shows the traveling direction of the recording medium. FIG. 23 is a cross-sectional view taken along line 23—23 of FIG. 22. FIG. 24 is a cross-sectional view of a modified example of this embodiment, taken along line 23—23 of FIG. 22.

In this embodiment, the yoke portion layer 14B has: a first layer $14B_1$ that is in contact with and magnetically connected to the first magnetic layer 8 and the surface of the pole portion layer 14A closer to the gap layer 9; and a second layer $14B_2$ that is in contact with and magnetically connected to the first layer $14B_1$ and the rear end surface of the pole portion layer 14A.

The first layer $14B_1$ of the yoke portion layer 14B is formed on the first magnetic layer 8 and the insulating layer 9B to extend from where the contact hole 9a is formed toward the medium facing surface ABS, to the end surface of the insulating layer 9C farther from the medium facing surface ABS. The thickness of the first layer $14B_1$ at the position of the contact hole 9a is greater than the total thickness of the insulating layers 9A and 9B, and is equal to or greater than 3 μm, for example. For example, the end of the first layer $14B_1$ closer to the medium facing surface ABS is located at a distance of 1.5 μm or more from the medium facing surface ABS, and located closer to the medium facing surface ABS than the rear end surface of the pole portion layer 14A. The first layer $14B_1$ may be made of an iron-nickel-based alloy or Permalloy, or of a high saturated magnetic flux density material.

The top surface of part of the first layer $14B_1$ of the yoke portion layer 14B located near the medium facing surface ABS and the top surface of the insulating layer 9C are flattened. The pole portion layer 14A is formed on the flattened top surfaces of the first layer $14B_1$ and the insulating layer 9C. Accordingly, the first layer $14B_1$ of the yoke portion layer 14B is in contact with and magnetically connected to part of the surface of the pole portion layer 14A closer to the gap layer 9.

The second layer $14B_2$ of the yoke portion layer 14B is disposed on the first layer $14B_1$. The second layer $14B_2$ is in contact with and magnetically connected to the first layer $14B_1$ and the rear end surface of the pole portion layer 14A. For example, the second layer $14B_2$ is 0.5 to 2 μm in thickness. For example, the second layer $14B_2$ may be made of an iron-nickel-based alloy or permalloy, or of a high saturated magnetic flux density material.

As shown in FIG. 22, in the cross section containing the interface between the yoke portion layer 14B and the pole portion layer 14A, the yoke portion layer 14B has a non-contact portion (corresponding to the line segment ab in FIG. 22) that is not in contact with the pole portion layer 14A. In this embodiment, the non-contact portion is located only on the side of the non-magnetic layer 15 relative to the pole portion layer 14A. In other words, Point c and Point d coincide.

Here, a straight line is assumed which is made by intersection of the cross section shown in FIG. 22 and a cross section containing the interface between the first layer $14B_1$ of the yoke portion layer 14B and the pole portion layer 14A. On this straight line, the position of the end of the first layer $14B_1$ closer to the medium facing surface is assumed to be Point e. At the part corresponding to the line segment ce, the first layer $14B_1$ and the pole portion layer 14A are magnetically connected to each other. Thus, in this embodiment the yoke portion layer 14B is magnetically connected to the pole portion layer 14A at the surface of the pole portion layer 14A closer to the gap layer 9, too. Accordingly, this embodiment allows to increase the area of the portion where the pole portion layer 14A and the yoke portion layer 14B are magnetically connected to each other, and as a result, it is possible to efficiently introduce magnetic flux from the yoke portion layer 14B into the pole portion layer 14A.

In the modified example shown in FIG. 24, the second layer $14B_2$ of the yoke portion layer 14B is magnetically connected to the pole portion layer 14A not only at the rear end surface of the pole portion layer 14A but also at both side surfaces of the pole portion layer 14A in the width direction. This modified example allows to increase the area of the portion where the yoke portion layer 14B and the pole portion layer 14A are connected to each other, even if the pole portion layer 14A is small in volume. As a result, it is possible to efficiently introduce magnetic flux from the yoke portion layer 14B into the pole portion layer 14A.

Now, a method for manufacturing the thin-film magnetic head of this embodiment will be described with reference to FIGS. 25 to 34. The substrate 1 up to the non-magnetic layer 7 are omitted in FIGS. 25 to 34.

The method of manufacturing the thin-film magnetic head of this embodiment employs the same steps as those of the first to third embodiments up to the step of forming the insulating layer 9B, as shown in FIG. 12.

Figure 25:
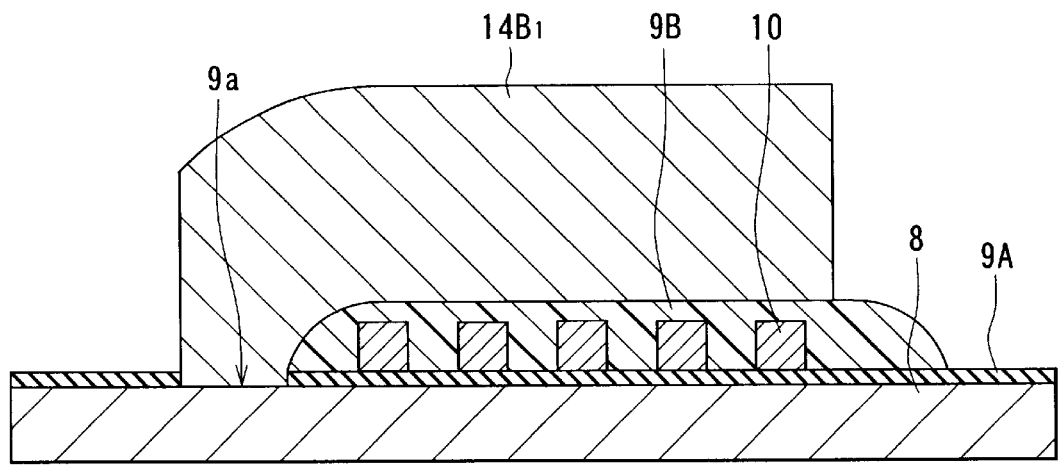
FIG. 25 is a cross-sectional view illustrating a step of a method of manufacturing the thin-film magnetic head according to the fourth embodiment of the invention.

Then, in this embodiment, as shown in FIG. 25, the first layer $14B_1$ of the yoke portion layer 14B is formed, using a known photolithography technique and a known deposition technique (e.g., electroplating), on the first magnetic layer 8 and the insulating layer 9B to extend from where the contact hole 9a is formed to a predetermined position towards the medium facing surface ABS. At this stage, for example, the first layer $14B_1$ is shaped to have a thickness of 3 μm or more, a depth (or a length perpendicular to the medium facing surface ABS) of 2 to 10 μm, and a width of 5 to 20 μm.

Figure 26:
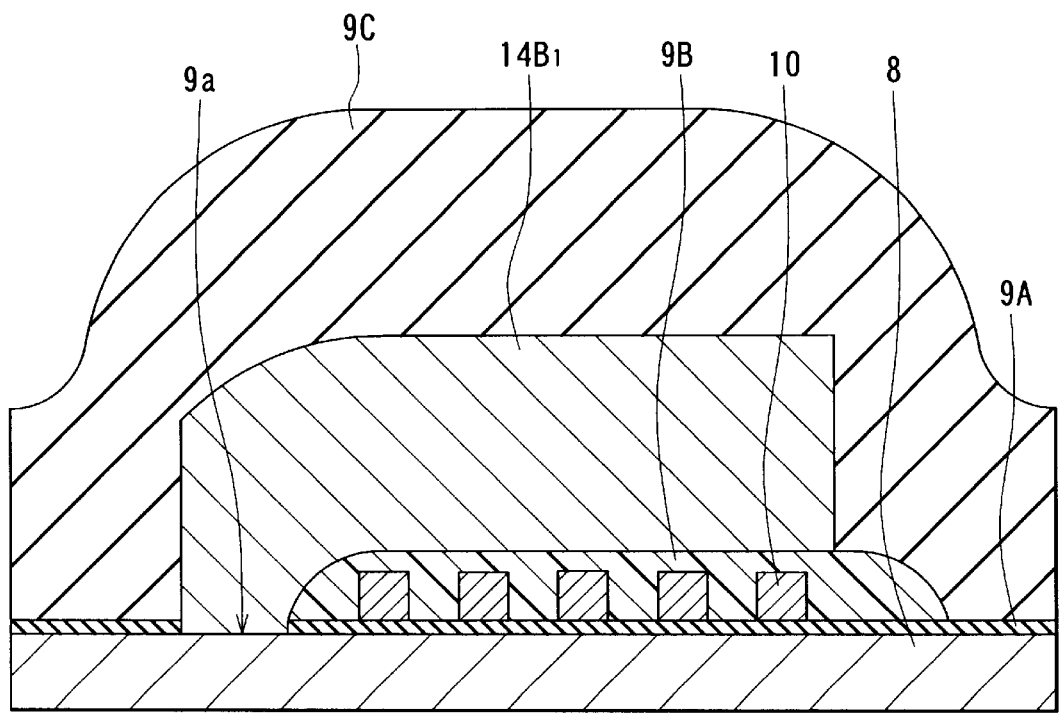
FIG. 26 is a cross-sectional view illustrating a step that follows FIG. 25.

Then, as shown in FIG. 26, the insulating layer 9C is formed by sputtering, so as to cover the insulating layer 9A, the insulating layer 9B, and the first layer $14B_1$ of the yoke portion layer 14B. At this stage, the insulating layer 9C has a thickness equal to or greater than that of the first layer $14B_1$.

Figure 27:
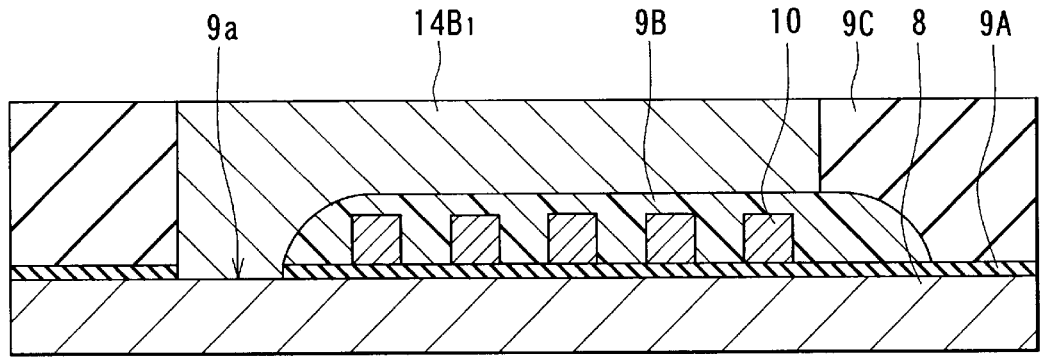
FIG. 27 is a cross-sectional view illustrating a step that follows FIG. 26.

Then, as shown in FIG. 27, the surface of the insulating layer 9C is polished by chemical mechanical polishing, for example, so that the first layer $14B_1$ of the yoke portion layer 14B is exposed, and the top surfaces of the insulating layer 9C and the first layer $14B_1$ are flattened. At this stage, the distance from the top surface of the first magnetic layer 8 to the top surface of the insulating layer 9C is 3 to 6 μm, for example.

Figure 28:
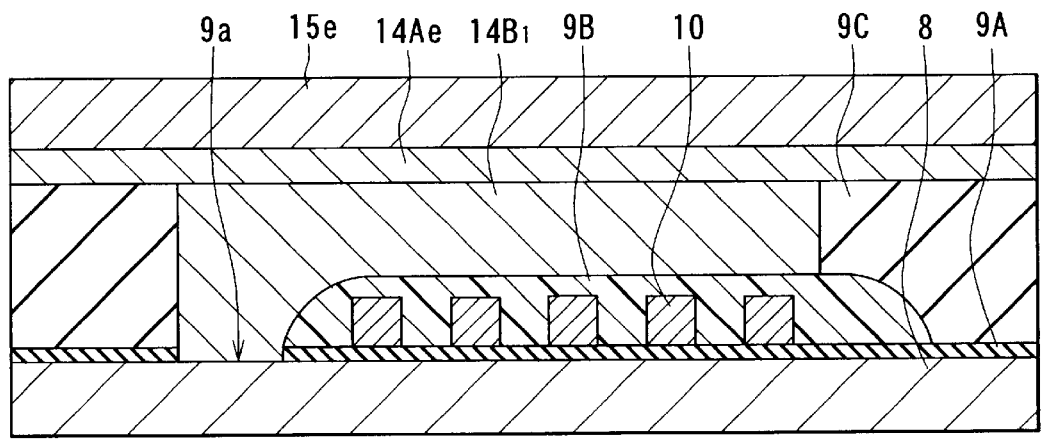
FIG. 28 is a cross-sectional view illustrating a step that follows FIG. 27.

Then, as shown in FIG. 28, on the insulating layer 9C and the first layer $14B_1$, the layer 14Ae to be etched and the non-magnetic layer 15e, which are the same as those of the first to third embodiments, are each formed.

Then, although not shown, an electrode layer for electroplating is formed by sputtering on the non-magnetic layer 15e. The electrode layer is equal to or less than 0.1 μm in thickness and made of an iron-nickel alloy, for example.

Figure 29:
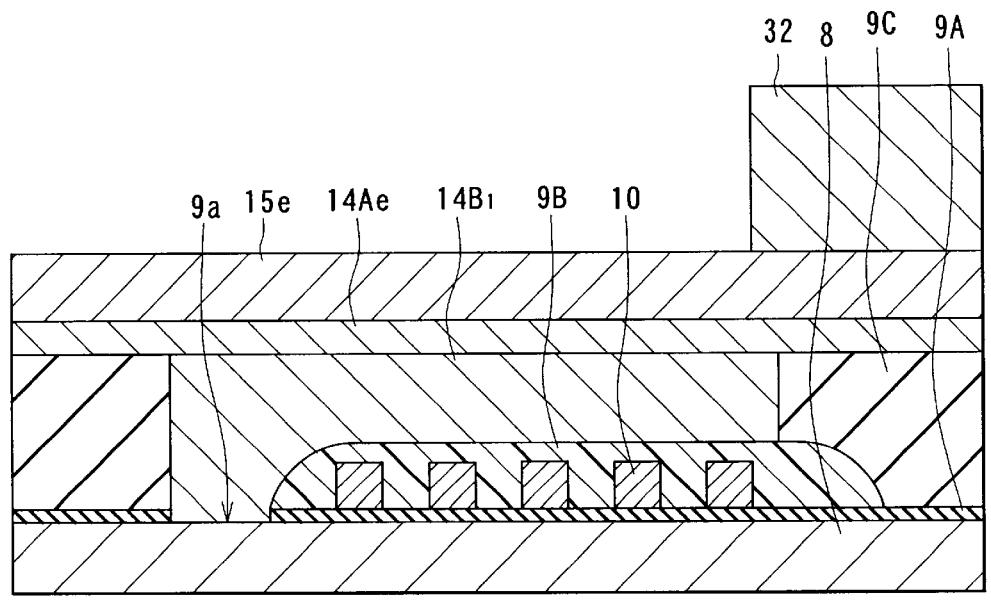
FIG. 29 is a cross-sectional view illustrating a step that follows FIG. 28.

Then, as shown in FIG. 29, like the first to third embodiments, the mask 32 for defining the shapes of the pole portion layer 14A and the non-magnetic layer 15 is formed on the aforementioned electrode layer.

Figure 30:
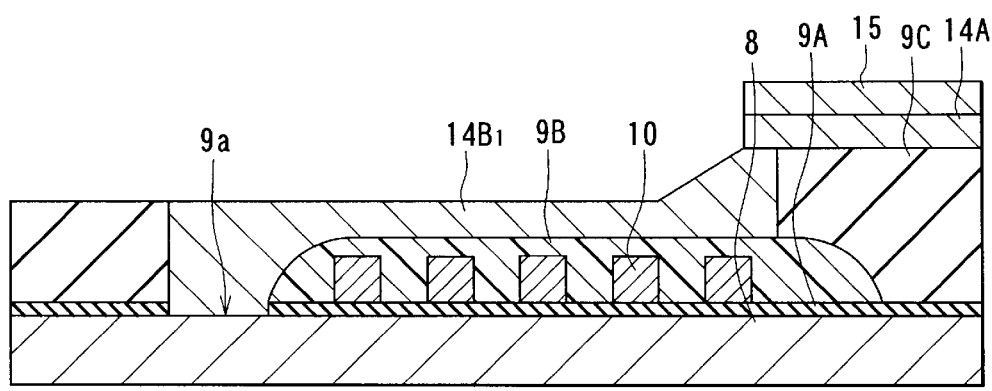
FIG. 30 is a cross-sectional view illustrating a step that follows FIG. 29.

Then, as shown in FIG. 30, using the mask 32, the non-magnetic layer 15e and the layer 14Ae are etched by dry etching such as ion milling to define the outer shapes of the non-magnetic layer 15 and the pole portion layer 14A. After the etching, the mask 32 may be allowed to remain if it is non-magnetic and sufficiently reliable in resistance to corrosion or the like, or may be removed if unnecessary.

Then, although not shown, an electrode layer for electroplating is formed by sputtering on the non-magnetic layer 15, the insulating layer 9C and the first layer 14B$_1$ of the yoke portion layer 14B. The electrode layer may have a thickness of 0.1 µm or less, and may be formed of an iron-nickel alloy, with Ti (titanium) deposited to underlie the electrode layer.

Figure 31:
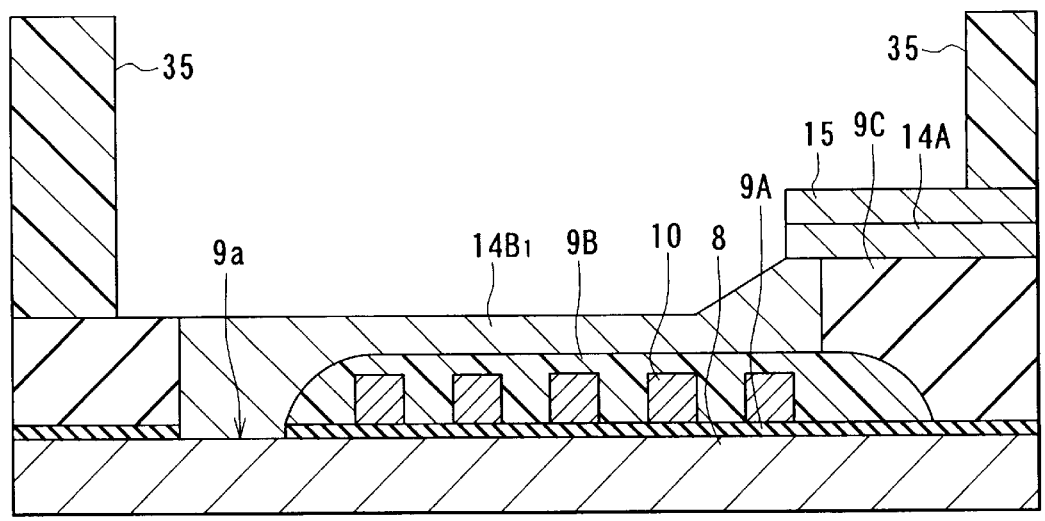
FIG. 31 is a cross-sectional view illustrating a step that follows FIG. 30.

Then, as shown in FIG. 31, the resist frame 35 having a gap portion corresponding to the shape of the second layer 14B$_2$ of the yoke portion layer 14B is formed of a photoresist on the aforementioned electrode layer.

Figure 32:
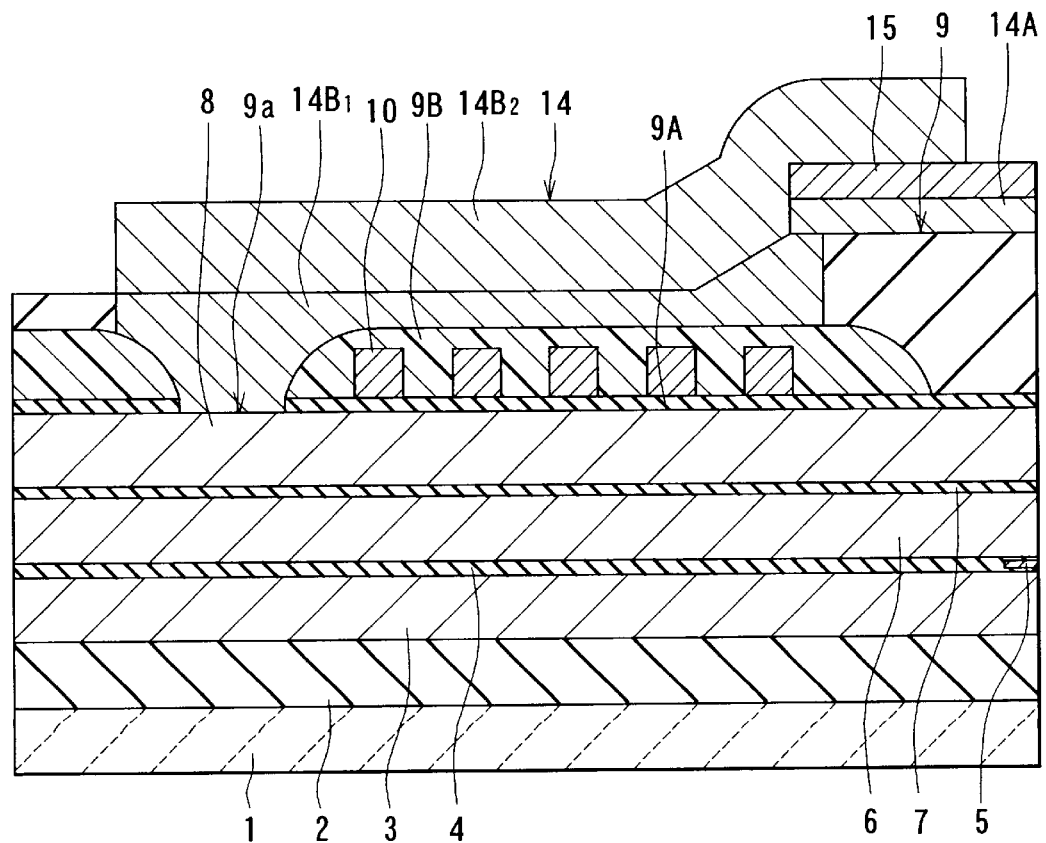
FIG. 32 is a cross-sectional view illustrating a step that follows FIG. 31.

Then, as shown in FIG. 32, using the resist frame 35, the second layer 14B$_2$ of the yoke portion layer 14B is formed on the electrode layer by electroplating (frame plating). The resist frame 35 is then removed.

Then, although not shown, the electrode layer, except for the portion underlying the second layer 14B$_2$ of the yoke portion layer 14B, is removed by dry etching.

Figure 33:
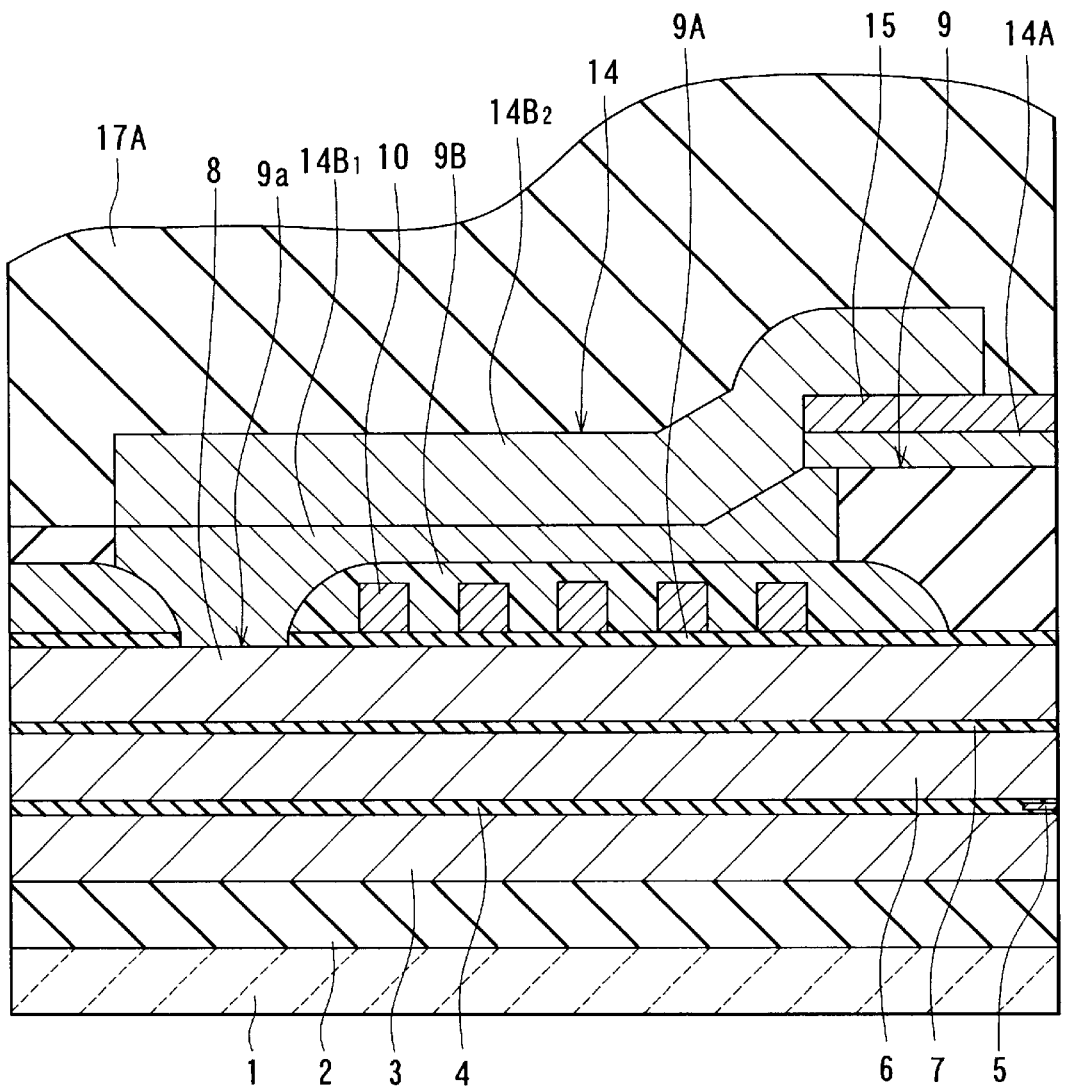
FIG. 33 is a cross-sectional view illustrating a step that follows FIG. 32.

Then, as shown in FIG. 33, the protective layer 17A is formed to cover the non-magnetic layer 15 and the second layer 14B$_2$ of the yoke portion layer 14B.

Figure 34:
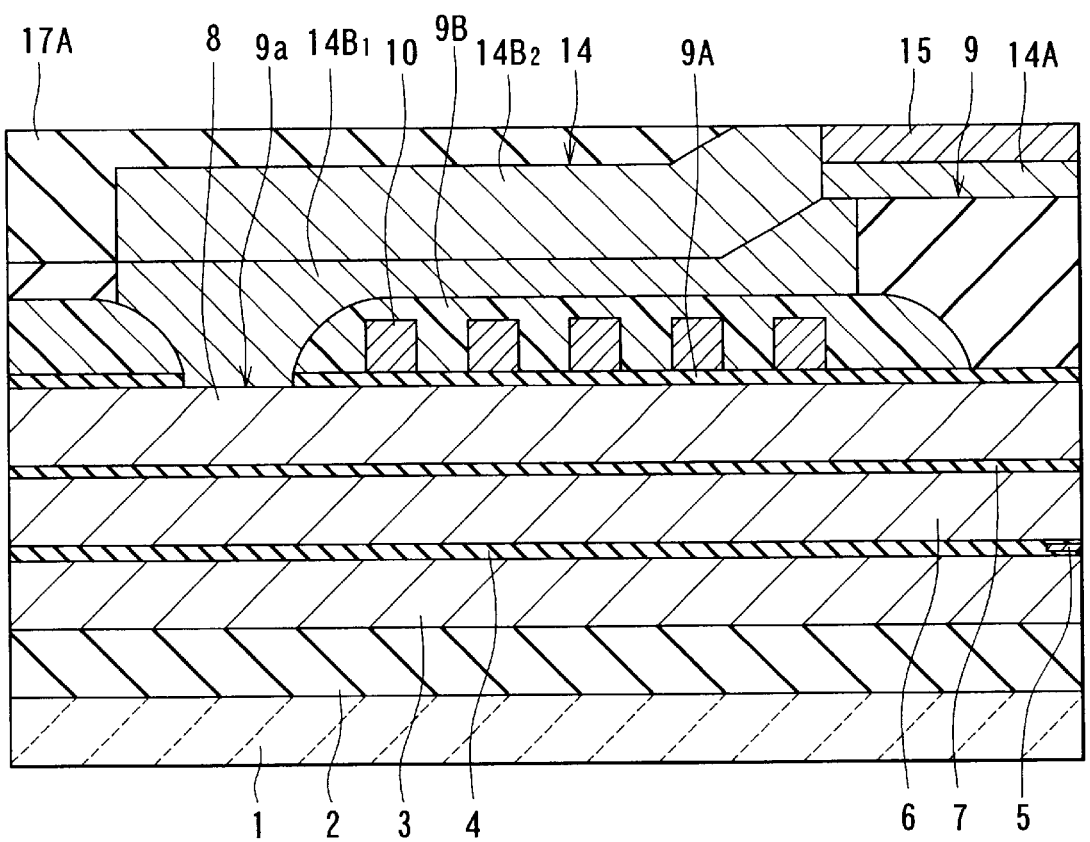
FIG. 34 is a cross-sectional view illustrating a step that follows FIG. 33.

Then, as shown in FIG. 34, the protective layer 17A is polished by chemical mechanical polishing, for example, so that the non-magnetic layer 15 is exposed, and, the vicinity of a part of the surface of the second layer 14B$_2$ of the yoke portion layer 14B farther from the gap layer 9, the part being magnetically connected to the pole portion layer 14A, is flattened together with the surface of the non-magnetic layer 15 farther from the gap layer 9 and with the top surface of the protective layer 17A. In FIG. 34, only part of the surface of the second layer 14B$_2$ of the yoke portion layer 14B farther from the gap layer 9 is exposed from the protective layer 17A. However, the entirety of the surface of the second layer 14B$_2$ farther from the gap layer 9 may be exposed from the protective layer 17A.

Then, as shown in FIG. 22, the protective layer 17B is formed to cover the entirety of the layered surface. Then, through the steps of forming leads, terminals and the like on the protective layer 17B, cutting the substrate for each slider, polishing the medium facing surface ABS, preparing rails for flying and so on, the thin-film magnetic head is completed.

The remainder of the structure, functions and effects of this embodiment are similar to those of the second embodiment including its modified example.

[Fifth Embodiment]

Figure 35:
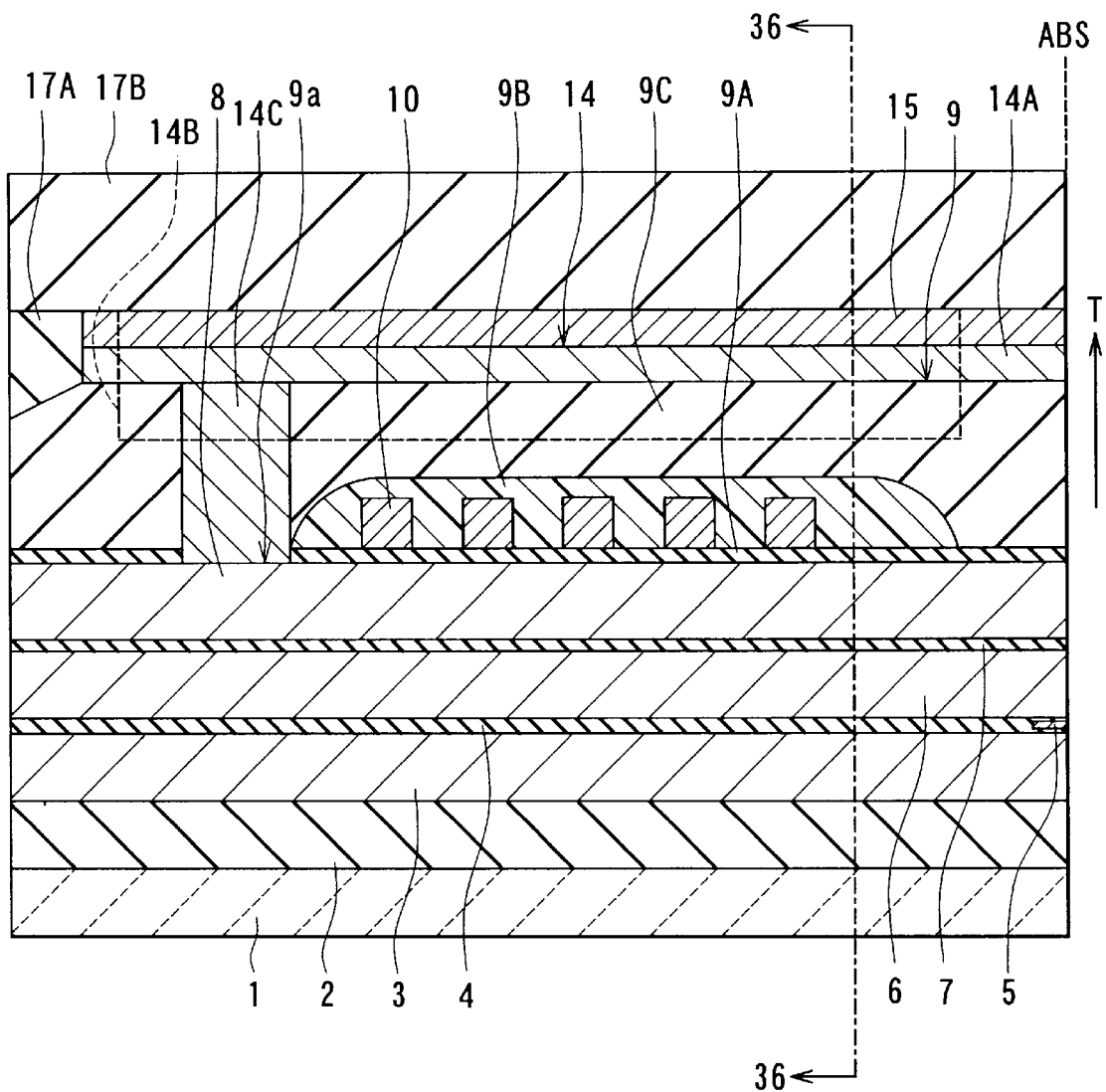
FIG. 35 is a cross-sectional view illustrating a structure of a thin-film magnetic head according to a fifth embodiment of the invention.
Figure 36:
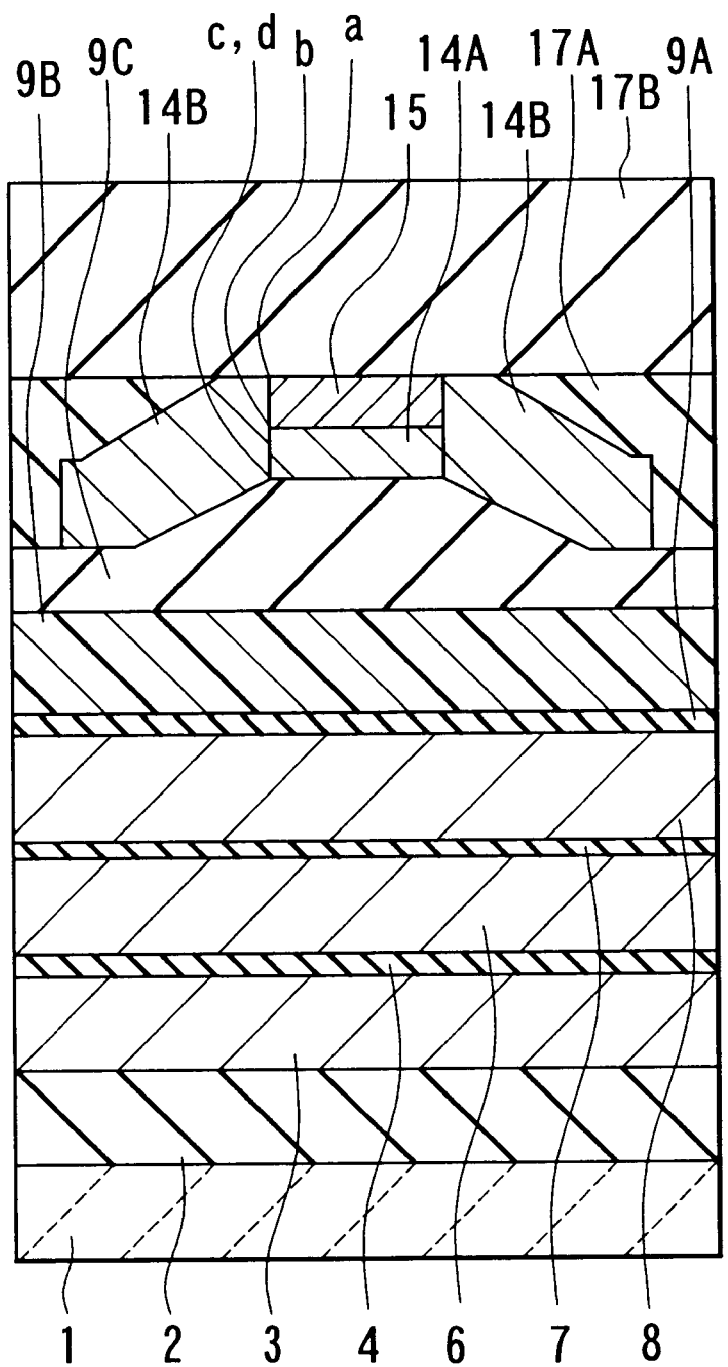
FIG. 36 is a cross-sectional view taken along line 36—36 of FIG. 35.
Figure 37:
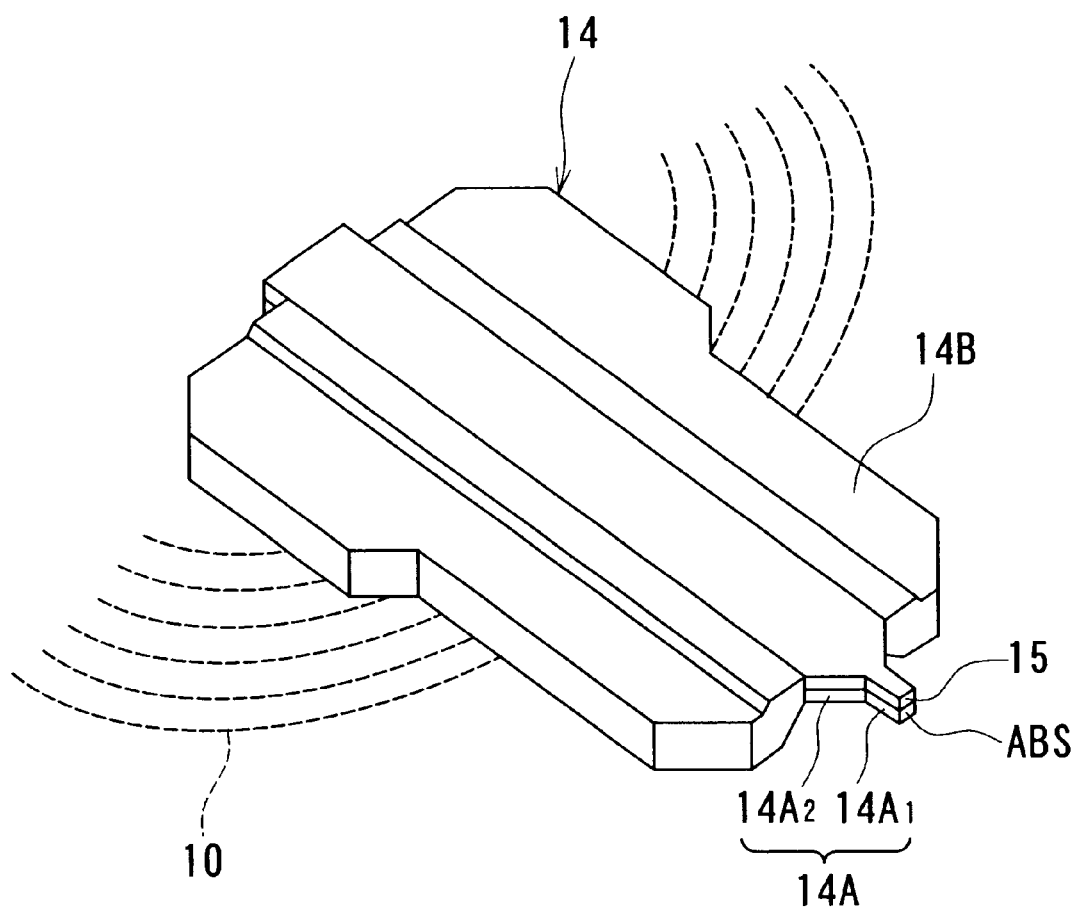
FIG. 37 is a perspective view illustrating the main part of the thin-film magnetic head according to the fifth embodiment of the invention.

Now, a thin-film magnetic head of a fifth embodiment of the invention will be described. FIG. 35 is a cross-sectional view illustrating the structure of the thin-film magnetic head of this embodiment. FIG. 35 shows a cross section orthogonal to the medium facing surface and the surface of the substrate. In addition, the arrow indicated by symbol T in FIG. 35 shows the traveling direction of the recording medium. FIG. 36 is a cross-sectional view taken along line 36—36 of FIG. 35. FIG. 37 is a perspective view illustrating the main part of the thin-film magnetic head shown in FIG. 35.

In this embodiment, the pole portion layer 14A and the non-magnetic layer 15 are formed on the insulating layer 9C over a region extending from the medium facing surface ABS to the coupling portion 14C. The upper end of the coupling portion 14C is magnetically connected to the surface of the pole portion layer 14A closer to the gap layer 9. The yoke portion layer 14B is magnetically connected to both side surfaces of the coupling portion 14C in the width direction. The yoke portion layer 14B is also magnetically connected to the pole portion layer 14A not at the rear end surface of the pole portion layer 14A but at both side surfaces of the pole portion layer 14A in the width direction.

Here, a straight line is assumed which is made by intersection of the cross section shown in FIG. 36 and the cross section containing the interface between the yoke portion layer 14B and the pole portion layer 14A. On this straight line, the position of an end of the yoke portion layer 14B that is farther from the gap layer 9 is assumed to be Point a; the position of an end of the pole portion layer 14A that is farther from the gap layer 9 is assumed to be Point b; the position of the other end of the pole portion layer 14A that is closer to the gap layer 9 is assumed to be Point c; and the position of the other end of the yoke portion layer 14B that is closer to the gap layer 9 is assumed to be Point d. In this embodiment, in the cross section containing the interface between the yoke portion layer 14B and the pole portion layer 14A, the yoke portion layer 14B is greater in thickness than the pole portion layer 14A. That is, in the cross section shown in FIG. 36, the line segment ad is longer than the line segment bc. Particularly, in the cross section containing the interface between the yoke portion layer 14B and the pole portion layer 14A, the yoke portion layer 14B has a non-contact portion (corresponding to the line segment ab in FIG. 36) that is not in contact with the pole portion layer 14A. In this embodiment, the non-contact portion is located only on the side of the non-magnetic layer 15 relative to the pole portion layer 14A. In other words, Point c and Point d coincide. However, the positional relationship among Points a to d may be the same as that in the first embodiment.

Figure 38:
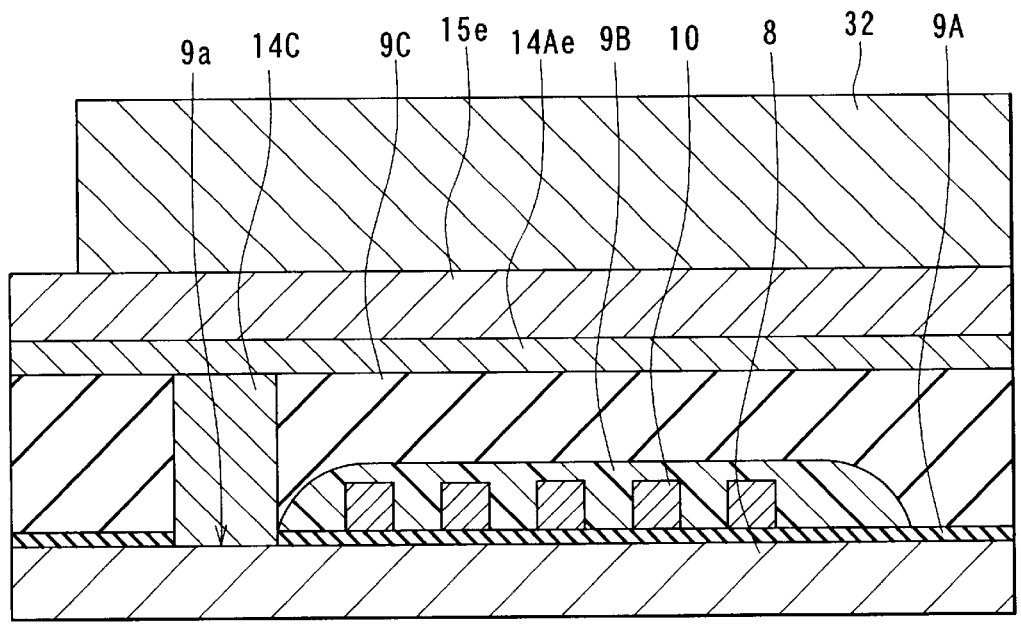
FIG. 38 is a cross-sectional view illustrating a step of a method of manufacturing the thin-film magnetic head according to the fifth embodiment of the invention.

Now, a method of manufacturing the thin-film magnetic head of this embodiment will be described with reference to FIG. 38 and FIG. 39. The substrate 1 up to the non-magnetic layer 7 are omitted in FIG. 38 and FIG. 39.

The method of manufacturing the thin-film magnetic head of this embodiment employs the same steps as those of the first to third embodiments up to the step of forming the non-magnetic layer 15e, as shown in FIG. 15.

In this embodiment, although not shown, an electrode layer for electroplating is then formed by sputtering on the non-magnetic layer 15e. Then, as shown in FIG. 38, the mask 32 for defining the shapes of the pole portion layer 14A and the non-magnetic layer 15 is formed on the aforementioned electrode layer.

Figure 39:
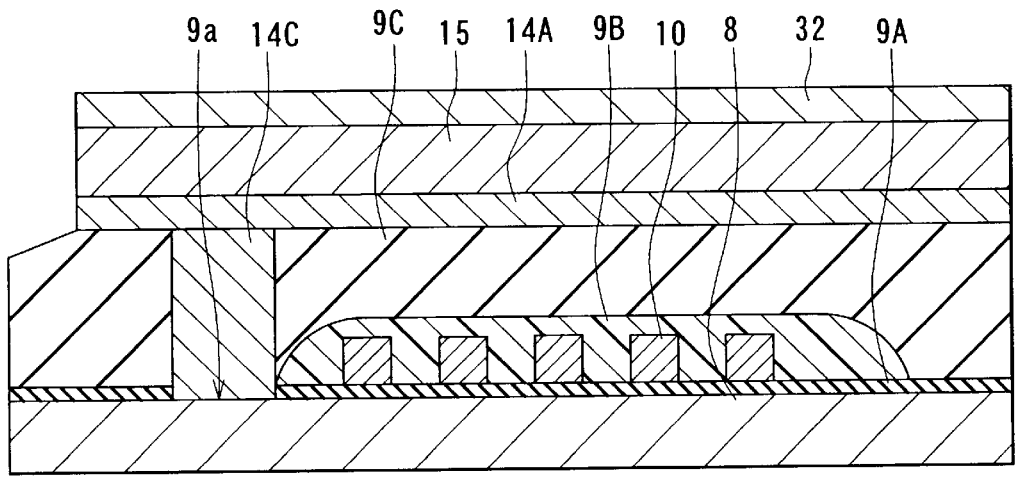
FIG. 39 is a cross-sectional view illustrating a step that follows FIG. 38.

Then, as shown in FIG. 39, using the mask 32, the non-magnetic layer 15e and the layer 14Ae are etched by dry etching such as ion milling to define the outer shapes of the non-magnetic layer 15 and the pole portion layer 14A. After the etching, the mask 32 may be allowed to remain if it is non-magnetic and sufficiently reliable in resistance to corrosion or the like, or may be removed if unnecessary.

Then, although not shown, an electrode layer for electroplating is formed by sputtering on the non-magnetic layer 15, the insulating layer 9C, and the coupling portion 14C.

The subsequent steps are the same as those in the first to third embodiments. That is, a resist frame having a gap portion corresponding to the shape of the yoke portion layer 14B is formed on the aforementioned electrode layer, using photoresist. Then, using the resist frame, the yoke portion layer 14B is formed on the electrode layer by electroplating (frame plating). The resist frame is then removed. Then, the electrode layer, except for the portion underlying the yoke portion layer 14B, is removed by dry etching. Then, the protective layer 17A is formed to cover the non-magnetic layer 15 and the yoke portion layer 14B. The protective layer 17A is polished by chemical mechanical polishing, for example, so that the non-magnetic layer 15 is exposed, and, at least the vicinity of a part of the surface of the yoke portion layer 14B farther from the gap layer 9, the part being magnetically connected to the pole portion layer 14A, is flattened together with the surface of the non-magnetic layer 15 farther from the gap layer 9 and with the top surface of the protective layer 17A. In FIG. 36 and FIG. 37, only part of the surface of the yoke portion layer 14B farther from the gap layer 9 is exposed from the protective layer 17A. However, the yoke portion layer 14B may be increased in thickness enough to allow the entirety of its surface farther from the gap layer 9 to be exposed from the protective layer 17A.

Then, as shown in FIG. 35, the protective layer 17B is formed to cover the entirety of the layered surface. Then, through the steps of forming leads, terminals and the like on the protective layer 17B, cutting the substrate for each slider, polishing the medium facing surface ABS, preparing rails for flying and so on, the thin-film magnetic head is completed.

The remainder of the structure, functions and effects of this embodiment are similar to those of the second embodiment, except that the yoke portion layer 14B is magnetically connected to the pole portion layer 14A not at the rear end surface of the pole portion layer 14A but at both side surfaces of the pole portion layer 14A in the width direction.

[Sixth Embodiment]

Figure 40:
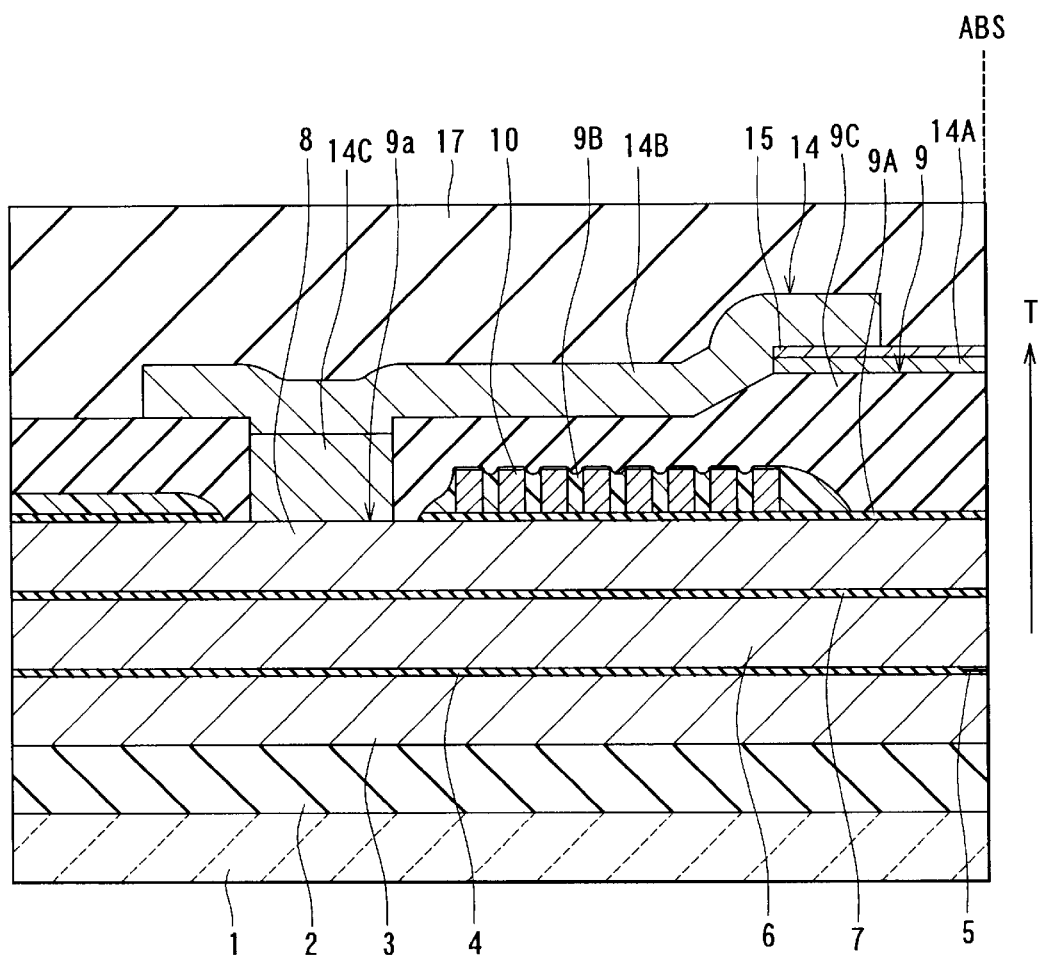
FIG. 40 is a cross-sectional view illustrating a structure of a thin-film magnetic head according to a sixth embodiment of the invention.
Figure 41:
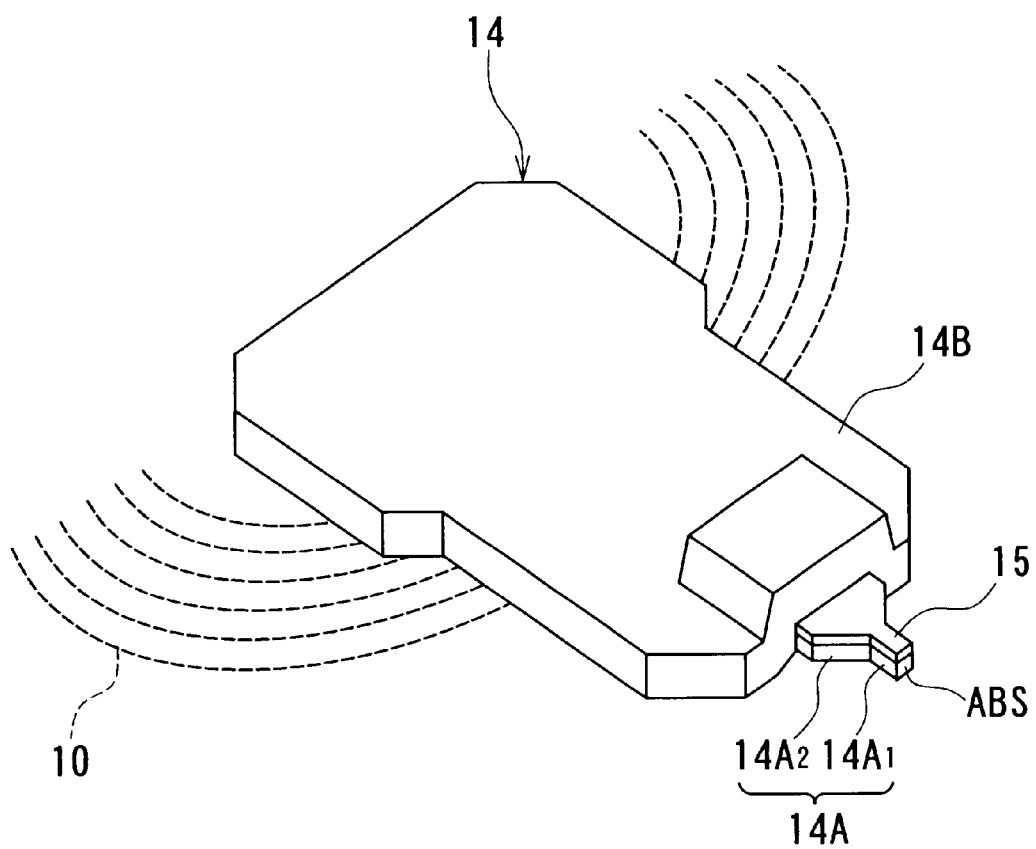
FIG. 41 is a perspective view illustrating the main part of the thin-film magnetic head according to the sixth embodiment of the invention.

Now, a thin-film magnetic head of a sixth embodiment of the invention will be described. FIG. 40 is a cross-sectional view illustrating the structure of the thin-film magnetic head of this embodiment. FIG. 40 shows a cross section orthogonal to the medium facing surface and the surface of the substrate. In addition, the arrow indicated by symbol T in FIG. 40 shows the traveling direction of the recording medium. FIG. 41 is a perspective view illustrating the main part of the thin-film magnetic head shown in FIG. 40.

In this embodiment, the yoke portion layer 14B is magnetically connected to the pole portion layer 14A at the rear end surface of the pole portion layer 14A and at both side surfaces of the pole portion layer 14A in the width direction. Further, part of the yoke portion layer 14B located near the medium facing surface ABS is adjacent to the surface of the pole portion layer 14A farther from the gap layer 9 via the non-magnetic layer 15, and is magnetically connected to the pole portion layer 14A via the non-magnetic layer 15. The end of the yoke portion layer 14B closer to the medium facing surface ABS is located at a distance of, for example, 1.5 μm or more from the medium facing surface ABS.

In this embodiment, since part of the yoke portion layer 14B located near the medium facing surface ABS is magnetically connected to the pole portion layer 14A via the non-magnetic layer 15, it is possible to introduce magnetic flux from the yoke portion layer 14B to the medium-facing-surface-ABS side of the pole portion layer 14A via the non-magnetic layer 15, through the surface of the pole portion layer 14A farther from the gap layer 9, too.

In this embodiment, as shown in FIG. 40, the pole portion layer 14B is greater in thickness than the pole portion layer 14A in a cross section containing the interface between the yoke portion layer 14B and the rear end surface of the pole portion layer 14A. In the cross section containing the interface between the yoke portion layer 14B and the rear end surface of the pole portion layer 14A, the yoke portion layer 14B has a non-contact portion that is not in contact with the pole portion layer 14A. The non-contact portion is located only on the side of the non-magnetic layer 15 relative to the pole portion layer 14A. In a cross section containing the interface between the yoke portion layer 14B and each side surface of the pole portion layer 14A in the width direction, too, the yoke portion layer 14B is greater in thickness than the pole portion layer 14A. The yoke portion layer 14B also has a non-contact portion that is not in contact with the pole portion layer 14A in the cross section containing the interface between the yoke portion layer 14B and each side surface of the pole portion layer 14A in the width direction. The non-contact portion is located only on the side of the non-magnetic layer 15 relative to the pole portion layer 14A.

Figure 42:
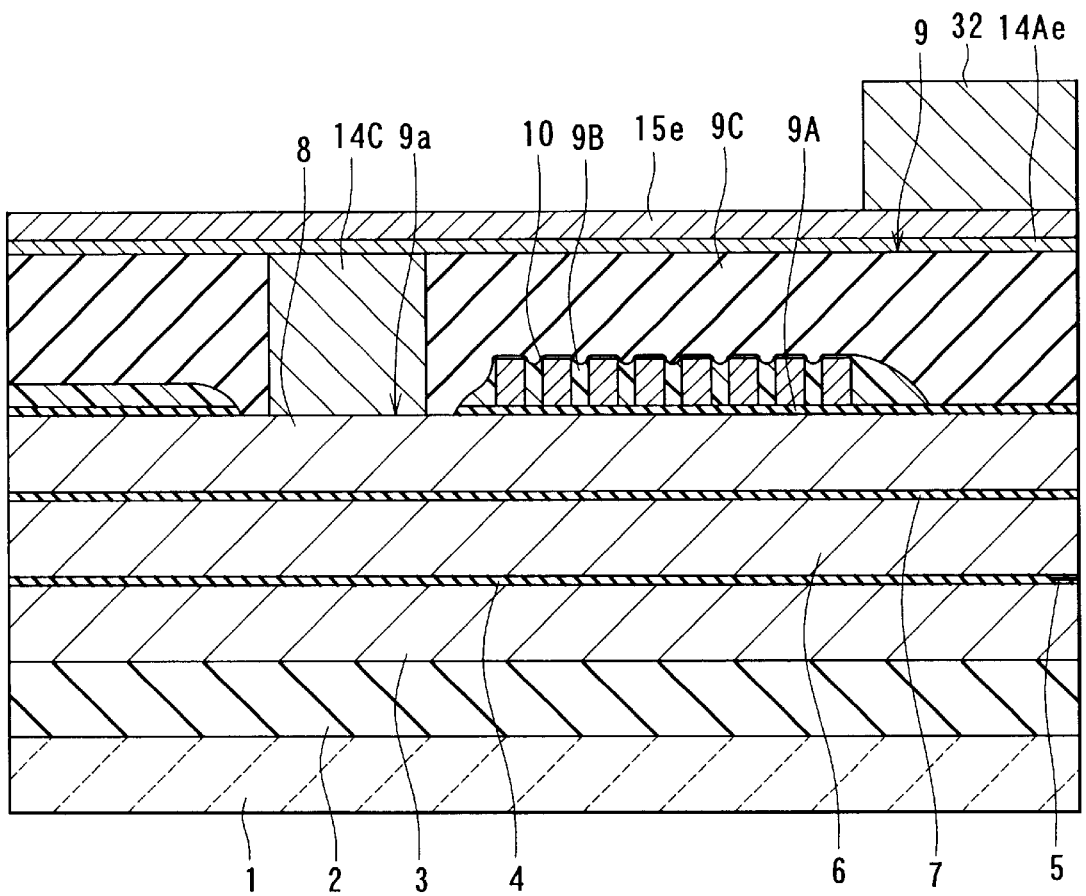
FIG. 42 is a cross-sectional view illustrating a step of a method of manufacturing the thin-film magnetic head according to the sixth embodiment of the invention.

Now, a method for manufacturing the thin-film magnetic head of this embodiment will be described with reference to FIGS. 42 to 44. The substrate 1 up to the non-magnetic layer 7 are omitted in FIGS. 42 to 44.

The method of manufacturing the thin-film magnetic head of this embodiment employs the same steps as those of the first to third embodiments up to the step of forming the non-magnetic layer 15e, as shown in FIG. 15. Then, although not shown, an electrode layer for electroplating is formed by sputtering on the non-magnetic layer 15e. Then, as shown in FIG. 42, the mask 32 for defining the shapes of the pole portion layer 14A and the non-magnetic layer 15 is formed on the aforementioned electrode layer.

Figure 43:
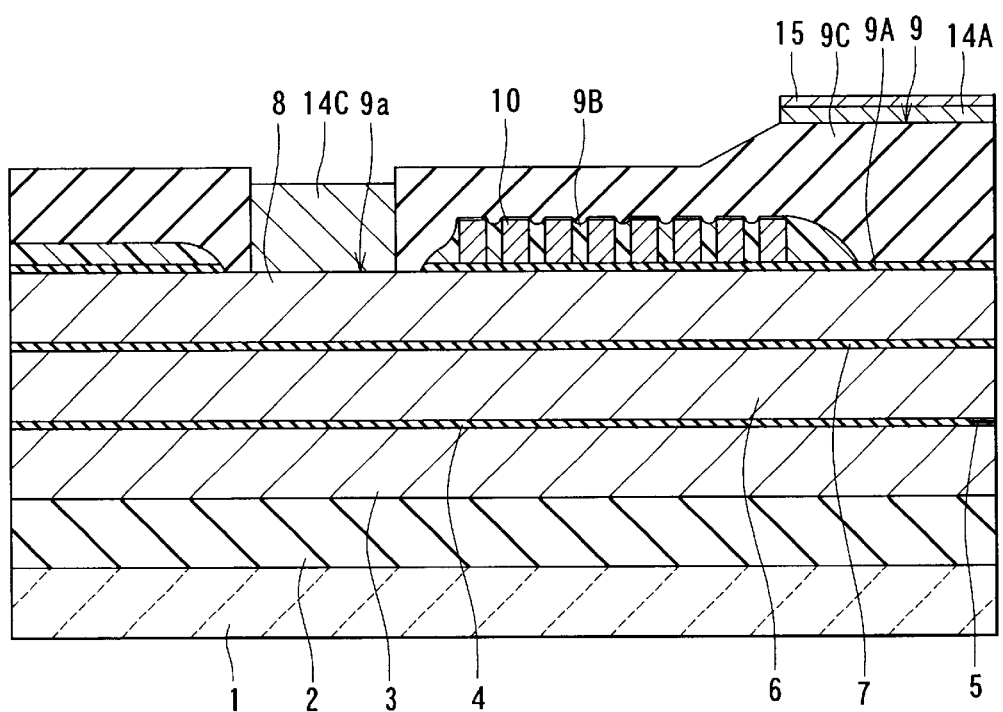
FIG. 43 is a cross-sectional view illustrating a step that follows FIG. 42.

Then, as shown in FIG. 43, using the mask 32, the non-magnetic layer 15e and the layer 14Ae are etched by dry etching such as ion milling to define the outer shapes of the non-magnetic layer 15 and the pole portion layer 14A. After the etching, the mask 32 may be allowed to remain if it is non-magnetic and sufficiently reliable in resistance to corrosion or the like, or may be removed if unnecessary.

Then, although not shown, an electrode layer for electroplating is formed by sputtering on the non-magnetic layer 15, the insulating layer 9C, and the coupling portion 14C.

Figure 44:
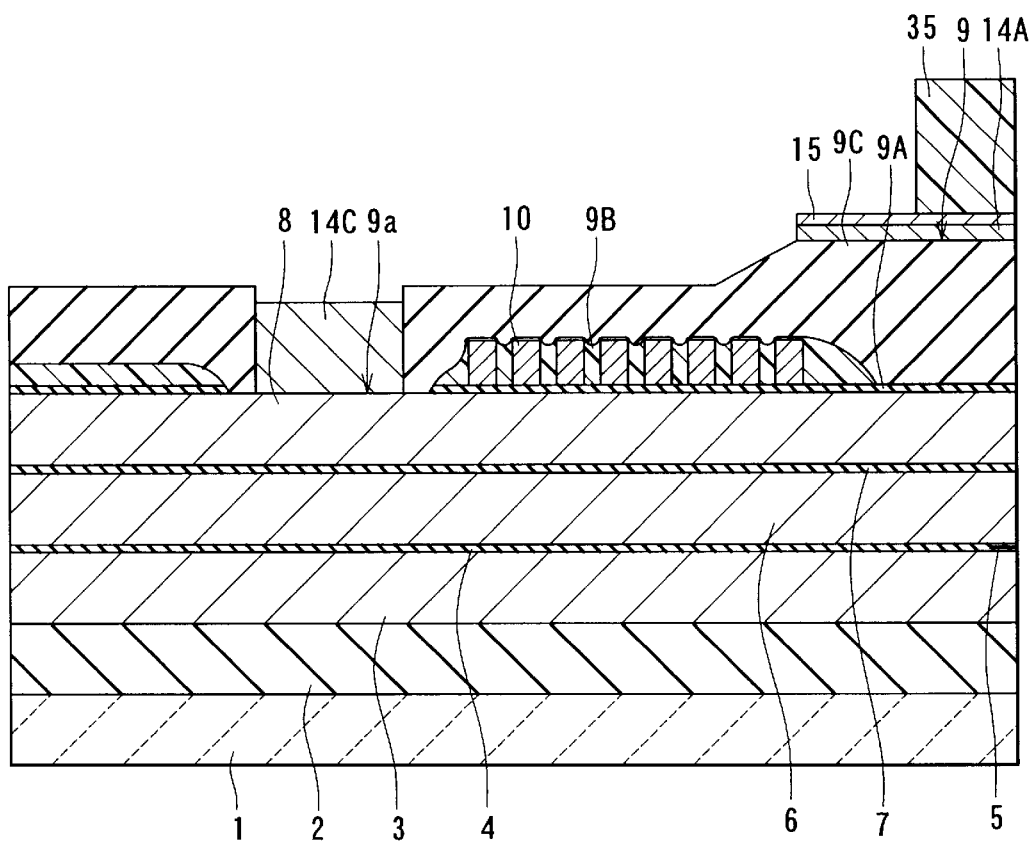
FIG. 44 is a cross-sectional view illustrating a step that follows FIG. 43.

Then, as shown in FIG. 44, the resist frame 35 having a gap portion corresponding to the shape of the yoke portion layer 14B is formed of a photoresist on the aforementioned electrode layer.

Then, as shown in FIG. 40, using the resist frame 35, the yoke portion layer 14B is formed on the electrode layer by electroplating (frame plating). The resist frame 35 is then removed. Then, the electrode layer, except for the portion underlying the yoke portion layer 14B, is removed by dry etching. Then, a protective layer 17 is formed to cover the non-magnetic layer 15 and the yoke portion layer 14B. Then, through the steps of forming leads, terminals and the like on the protective layer 17, cutting the substrate for each slider, polishing the medium facing surface ABS, preparing rails for flying and so on, the thin-film magnetic head is completed.

Since the head of this embodiment is provided with the non-magnetic layer 15 that is in contact with the surface of the pole portion layer 14A farther from the gap layer 9, it is possible to prevent the surface of the pole portion layer 14A farther from the gap layer 9 from being damaged when forming the yoke portion layer 14B by electroplating, and to thereby make the surface flat. In particular, since the non-magnetic layer 15 is exposed in the medium facing surface ABS, this embodiment allows the end of the pole portion layer 14A farther from the gap layer 9 to be kept flat in the medium facing surface ABS. This allows the magnetic field generated from the pole portion layer 14A in the medium facing surface ABS to be made uniform in the direction intersecting the track. Consequently, it is possible to prevent the bit pattern of the recording medium from being distorted in shape, and to thereby improve the linear recording density.

The remainder of the structure, functions and effects of this embodiment are similar to those of the second embodiment.

The present invention is not limited to the foregoing embodiments but may be practiced in still other ways. For example, in the present invention the yoke portion layer 14B is magnetically connected to the pole portion layer 14A at least in part of the rear end surface and both side surfaces in the width direction of the pole portion layer 14A. Alternatively, the yoke portion layer 14B may be magnetically connected to the pole portion layer 14A at both of the surfaces of the pole portion layer 14A closer to the gap layer 9 and farther from the gap layer 9.

As described above, in the thin-film magnetic head of the present invention the second magnetic layer has the pole portion layer and the yoke portion layer. It is therefore possible to reduce the track width without decreasing the intensity of the magnetic field to be applied to the recording medium. Furthermore, in the present invention the yoke portion layer is greater in thickness than the pole portion layer in the cross section containing the interface between the yoke portion layer and the pole portion layer. Accordingly, it is possible to prevent the saturation of magnetic flux in the yoke portion layer near the interface between the pole portion layer and the yoke portion layer. This makes it possible to efficiently introduce magnetic flux from the yoke portion layer into the pole portion layer, and as a result, it is possible to increase the intensity of the magnetic field generated from the magnetic pole portion in the direction perpendicular to the surface of the recording medium. Furthermore, the thin-film magnetic head of the invention is provided with the non-magnetic layer that is in contact with the entirety of the surface of the pole portion layer farther from the gap layer. It is therefore possible to prevent the surface of the pole portion layer farther from the gap layer from being damaged in the manufacturing process of the thin-film magnetic head, and thereby to keep the surface flat. Therefore, according to the invention, the end of the pole portion layer farther from the gap layer is kept flat in the medium facing surface, and the magnetic field generated from the pole portion layer in the medium facing surface is made uniform in the direction intersecting the track. As a result, it is possible to prevent the bit pattern of the recording medium from being distorted in shape, and to thereby improve the linear recording density. Consequently, the present invention can increase the intensity of the magnetic field generated from the magnetic pole portion in the direction perpendicular to the surface of the recording medium, thereby improving the recording density.

In the thin-film magnetic head of the invention, in the cross section containing the interface between the yoke portion layer and the pole portion layer, the yoke portion layer may include: a first non-contact portion that is not in contact with the pole portion layer and is located on the side of the gap layer relative to the pole portion layer; and a second non-contact portion that is not in contact with the pole portion layer and is located on the side of the non-magnetic layer relative to the pole portion layer, the second non-contact portion being greater than the first non-contact portion in thickness. In this case, it is possible to reduce the magnetic flux coming from the yoke portion layer to the first magnetic layer not via the pole portion layer but via the gap layer. This makes it possible to introduce the magnetic flux from the yoke portion layer into the pole portion layer with improved efficiency.

In the thin-film magnetic head of the invention, in the cross section containing the interface between the yoke portion layer and the pole portion layer, the yoke portion layer may include a non-contact portion that is not contact with the pole portion layer and is located only on the side of the non-magnetic layer relative to the pole portion layer. In this case, it is possible to reduce the magnetic flux coming from the yoke portion layer to the first magnetic layer not via the pole portion layer but via the gap layer. This makes it possible to introduce the magnetic flux from the yoke portion layer into the pole portion layer with improved efficiency.

In the thin-film magnetic head of the invention, the yoke portion layer may be magnetically connected to the pole portion layer further at a surface of the pole portion layer closer to the gap layer. In this case, a greater area is available for the portion where the yoke portion layer and the pole portion layer are magnetically connected to each other, and it is therefore possible to introduce the magnetic flux from the yoke portion layer into the pole portion layer more efficiently.

In the thin-film magnetic head of the invention, the vicinity of a part of the surface of the yoke portion layer farther from the gap layer, the part being magnetically connected to the pole portion layer at least in part of: the end surface of the pole portion layer farther from the medium facing surface; and both side surfaces of the pole portion layer in the width direction, may be flattened together with the surface of the non-magnetic layer farther from the gap layer. In this case, it is possible to increase the percentage of the component of the magnetic field generated from the magnetic pole portion in the direction perpendicular to the surface of the recording medium.

In the thin-film magnetic head of the invention, the yoke portion layer may be adjacent to the surface of the pole portion layer farther from gap layer via the non-magnetic layer, and may be magnetically connected to the pole portion layer via the non-magnetic layer. In this case, a greater area is available for the portion where the yoke portion layer and the pole portion layer are magnetically connected to each other, and it is therefore possible to introduce the magnetic flux from the yoke portion layer into the pole portion layer more efficiently.

In the thin-film magnetic head of the invention, the pole portion layer may have a saturated magnetic flux density equal to or greater than that of the yoke portion layer. In this case, it is possible to prevent a saturation of the magnetic flux halfway through the second magnetic layer.

The thin-film magnetic head of the invention may further comprise a magnetoresistive element as a read element. In this case, read performance can be improved as compared with the case where reading is performed by using an induction-type electromagnetic transducer.

The thin-film magnetic head of the invention may be employed for a vertical magnetic recording scheme. In this case, it is possible to make the thin-film magnetic head impervious to heat fluctuations of the recording medium, thereby increasing the linear recording density.

According to the method of manufacturing a thin-film magnetic head of the invention, since the second magnetic layer has the pole portion layer and the yoke portion layer, it is possible to reduce the track width without decreasing the intensity of the magnetic field to be applied to the recording medium. Furthermore, in the present invention the yoke portion layer is greater in thickness than the pole portion layer in the cross section containing the interface between the yoke portion layer and the pole portion layer.

Accordingly, it is possible to prevent the saturation of magnetic flux in the yoke portion layer near the interface between the pole portion layer and the yoke portion layer. This makes it possible to efficiently introduce magnetic flux from the yoke portion layer 14B into the pole portion layer 14A, and as a result, it is possible to increase the intensity of the magnetic field generated from the magnetic pole portion in the direction perpendicular to the surface of the recording medium. Furthermore, in the present invention the non-magnetic layer is formed to be in contact with the entirety of the surface of the pole portion layer farther from the gap layer. It is therefore possible to prevent the surface of the pole portion layer farther from the gap layer from being damaged in the manufacturing process of the thin-film magnetic head, and thereby to keep the surface flat. Therefore, according to the invention, the end of the pole portion layer farther from the gap layer is kept flat in the medium facing surface, and the magnetic field generated from the pole portion layer in the medium facing surface is made uniform in the direction intersecting the track. As a result, it is possible to prevent the bit pattern of the recording medium from being distorted in shape, and to thereby improve the linear recording density. Consequently, the present invention can increase the intensity of the magnetic field generated from the magnetic pole portion in the direction perpendicular to the surface of the recording medium, thereby improving the recording density.

In the method for manufacturing a thin-film magnetic head of the invention, the vicinity of a part of the surface of the yoke portion layer farther from the gap layer, the part being magnetically connected to the pole portion layer at least in part of the end surface of the pole portion layer farther from the medium facing surface and both side surfaces of the pole portion layer in the width direction, may be flattened together with the surface of the non-magnetic layer farther from the gap layer. In this case, it is possible to increase the percentage of the component of the magnetic field generated from the magnetic pole portion in the direction perpendicular to the surface of the recording medium.

Obviously many modifications and variations of the present invention are possible in the light of the above teachings. It is therefore to be understood that within the range of equivalency of the appended claims the present invention may be carried out otherwise than as specifically described.

What is claimed is:

1. A thin-film magnetic head comprising:
    a medium facing surface that faces toward a recording medium;
    a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium;
    a gap layer made of a non-magnetic material and provided between the first and second magnetic layers; and
    a thin-film coil at least a part of which is disposed between the first and second magnetic layers and insulated from the first and second magnetic layers, wherein:
        the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other,
        the pole portion layer and the yoke portion layer are separate from each other, and the pole portion layer has a saturated magnetic flux density greater than that of the yoke portion layer,
        the head further comprises a non-magnetic layer that is in contact with the entirety of a surface of the pole portion layer farther from the gap layer,
        the yoke portion layer is magnetically connected to the pole portion layer at least in part of: an end surface of the pole portion layer farther from the medium facing surface; and both side surfaces of the pole portion layer in the width direction, and
    in a cross section containing an interface between the yoke portion layer and the pole portion layer, the yoke portion layer is greater than the pole portion layer in thickness.

2. A thin-film magnetic head according to claim 1, wherein,
    in the cross section containing the interface between the yoke portion layer and the pole portion layer, the yoke portion layer includes: a first non-contact portion that is not in contact with the pole portion layer and is located on the side of the gap layer relative to the pole portion layer; and a second non-contact portion that is not in contact with the pole portion layer and is located on the side of the non-magnetic layer relative to the pole portion layer, the second non-contact portion being greater than the first non-contact portion in thickness.

3. A thin-film magnetic head according to claim 1, wherein:
    in the cross section containing the interface between the yoke portion layer and the pole portion layer, the yoke portion layer includes a non-contact portion that is not contact with the pole portion layer and is located only on the side of the non-magnetic layer relative to the pole portion layer.

4. A thin-film magnetic head according to claim 1, wherein the yoke portion layer is magnetically connected to the pole portion layer further at a surface of the pole portion layer closer to the gap layer.

5. A thin-film magnetic head according to claim 1, wherein:
    a part of a surface of the yoke portion layer farther from the gap layer, the part being located in the vicinity of a part of the yoke portion layer magnetically connected to the pole portion layer at least in part of: the end surface of the pole portion layer farther from the medium facing surface; and both side surfaces of the pole portion layer in the width direction, is flattened together with a surface of the non-magnetic layer farther from the gap layer.

6. A thin-film magnetic head according to claim 1, wherein the yoke portion layer is adjacent to the surface of the pole portion layer farther from gap layer via the non-magnetic layer, and magnetically connected to the pole portion layer via the non-magnetic layer.

7. A thin-film magnetic head according to claim 1, further comprising a magnetoresistive element as a read element.

8. A thin-film magnetic head according to claim 1, being employed for a vertical magnetic recording scheme.

9. A method of manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other, the method comprising the steps of:

forming the first magnetic layer;

forming the gap layer;

forming the thin-film coil; and forming the second magnetic layer having the pole portion layer and the yoke portion layer, such that the yoke portion layer is magnetically connected to the pole portion layer at least in a part of: an end surface of the pole portion layer farther from the medium facing surface; and both side surfaces of the pole portion layer in the width direction, and such that the yoke portion layer is greater in thickness than the pole portion layer in a cross section containing an interface between the yoke portion layer and the pole portion layer, and forming a non-magnetic layer that is in contact with the entirety of a surface of the pole portion layer farther from the gap layer, wherein the step of forming the second magnetic layer and the non-magnetic layer includes the steps of: forming the pole portion layer; forming the non-magnetic layer on the pole portion layer; forming at least a part of the yoke portion layer magnetically connected to the pole portion layer; forming a protective layer so as to cover the non-magnetic layer and the yoke portion layer; and polishing the protective layer to expose the non-magnetic layer, and then flattening a part of a surface of the yoke portion layer farther from the gap layer, the part being located in the vicinity of a part of the yoke portion layer magnetically connected to the pole portion layer at least in part of: the end surface of the pole portion layer farther from the medium facing surface; and both side surfaces of the pole portion layer in the width direction, together with a surface of the non-magnetic layer farther from the gap layer.

10. A method of manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other, the pole portion layer and the yoke portion layer being separate from each other, and the pole portion layer having a saturated magnetic flux density greater than that of the yoke portion layer, the method comprising the steps of:

forming the first magnetic layer;

forming the gap layer;

forming the thin-film coil; and forming the second magnetic layer having the pole portion layer and the yoke portion layer, such that the yoke portion layer is magnetically connected to the pole portion layer at least in a part of: an end surface of the pole portion layer farther from the medium facing surface; and both side surfaces of the pole portion layer in the width direction, and such that the yoke portion layer is greater in thickness than the pole portion layer in a cross section containing an interface between the yoke portion layer and the pole portion layer, and forming a non-magnetic layer that is in contact with the entirety of a surface of the pole portion layer farther from the gap layer.

11. A method of manufacturing a thin-film magnetic head according to claim 10, wherein the step of forming the second magnetic layer and the non-magnetic layer includes the steps of: forming the pole portion layer; forming the non-magnetic layer on the pole portion layer; forming at least a part of the yoke portion layer magnetically connected to the pole portion layer; forming a protective layer so as to cover the non-magnetic layer and the yoke portion layer; and polishing the protective layer to expose the non-magnetic layer, and then flattening a part of a surface of the yoke portion layer farther from the gap layer, the part being located in the vicinity of a part of the yoke portion layer magnetically connected to the pole portion layer at least in part of: the end surface of the pole portion layer farther from the medium facing surface; and both side surfaces of the pole portion layer in the width direction, together with a surface of the non-magnetic layer farther from the gap layer.

* * * * *